(12) United States Patent
Kitada et al.

(10) Patent No.: US 8,187,048 B2
(45) Date of Patent: May 29, 2012

(54) SYSTEM AND METHOD FOR MANUFACTURING OPTICAL DISPLAY DEVICE

(75) Inventors: Kazuo Kitada, Ibaraki (JP); Tomokazu Yura, Ibaraki (JP); Satoru Koshio, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/002,234

(22) PCT Filed: May 6, 2010

(86) PCT No.: PCT/JP2010/057771
§ 371 (c)(1),
(2), (4) Date: Dec. 30, 2010

(87) PCT Pub. No.: WO2010/131597
PCT Pub. Date: Nov. 18, 2010

(65) Prior Publication Data
US 2011/0111667 A1    May 12, 2011

(30) Foreign Application Priority Data

May 15, 2009  (JP) .................... 2009-118955
Apr. 14, 2010  (JP) .................... 2010-093207
Apr. 30, 2010  (JP) .................... 2010-105267

(51) Int. Cl.
*H01J 9/00* (2006.01)
*B32B 37/00* (2006.01)
*B32B 37/14* (2006.01)

(52) U.S. Cl. ............ 445/25; 445/66; 349/190; 349/192; 156/106; 156/107; 156/235; 156/237; 156/502; 156/516; 156/517

(58) Field of Classification Search .................... 445/24, 445/25; 156/99–107, 441.5–442.4, 510–522, 156/230–271; 349/187–192
See application file for complete search history.

(56) References Cited

U.S. PATENT DOCUMENTS
2005/0016670 A1   1/2005   Kanbara et al.
(Continued)

FOREIGN PATENT DOCUMENTS
JP    2004-144908 A    5/2004
(Continued)

OTHER PUBLICATIONS

International Search Report of PCT/JP2010/057771, mailing date Jun. 22, 2010.
(Continued)

*Primary Examiner* — Mariceli Santiago
(74) *Attorney, Agent, or Firm* — Westerman, Hattori, Daniels & Adrian, LLP

(57) ABSTRACT

A system and a method for manufacturing an optical display device. The system includes a first cutting and bonding apparatus to handle a first roll of sheet material including a first optical film with a width corresponding to the short side of an optical display unit and to bond the first optical film to one surface of the optical display unit and then to cut the first optical film into a length corresponding to the long side of the optical display unit. A second cutting and bonding apparatus handles a second roll of sheet material including a second optical film with a width corresponding to the long side of the optical display unit and bonds the second optical film to the other surface of the optical display unit and then cuts the second optical film into a length corresponding to the short side of the optical display unit.

4 Claims, 11 Drawing Sheets

U.S. PATENT DOCUMENTS

| | | | |
|---|---|---|---|
| 2006/0124248 A1* | 6/2006 | Kanbara et al. | 156/510 |
| 2008/0074585 A1 | 3/2008 | Yoshimi | |
| 2009/0159175 A1 | 6/2009 | Nakahira et al. | |
| 2009/0218049 A1 | 9/2009 | Kanbara et al. | |
| 2010/0186890 A1 | 7/2010 | Kitada et al. | |
| 2010/0282406 A1 | 11/2010 | Kitada et al. | |
| 2011/0111667 A1 | 5/2011 | Kitada et al. | |

FOREIGN PATENT DOCUMENTS

| | | |
|---|---|---|
| JP | 2005-037417 A | 2/2005 |
| JP | 2007-140046 A | 6/2007 |
| JP | 2008-102471 A | 5/2008 |
| JP | 2009-122641 A | 6/2009 |
| JP | 4307510 B1 | 8/2009 |
| TW | 2009-33236 A | 8/2009 |
| TW | I340276 B | 4/2011 |
| WO | 2009/054519 A1 | 4/2009 |

OTHER PUBLICATIONS

Taiwanese Search Report, issued in corresponding Taiwanese Patent Application No. 099114972.

Supplementary European Search Report dated Jun. 16, 2011, issued in corresponding European Patent Application No. 10774854.3.

Notification of Transmittal of Translation of the International Preliminary Report on Patentability (Form PCT/IB/338) of International Application No. PCT/JP2010/057771 mailed Dec. 22, 2011 with Forms PCT/IB/373 and PCT/ISA/237.

Taiwanese Office Action dated May 25, 2011, issued in corresponding Taiwanese Patent Application No. 099140647.

Taiwanese Search Report dated May 17, 2011, issued in corresponding Taiwanese Patent Application No. 099140647.

* cited by examiner

Fig.10
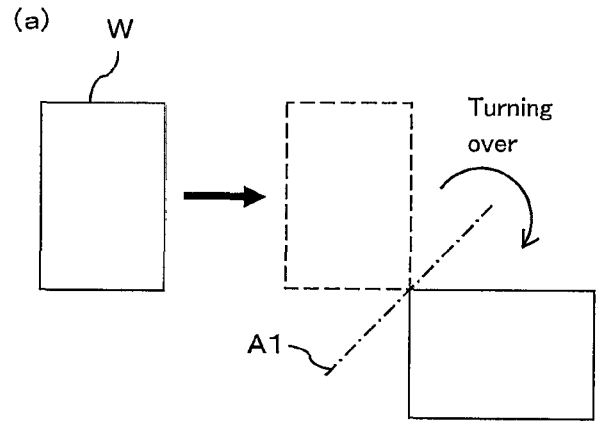
(a)
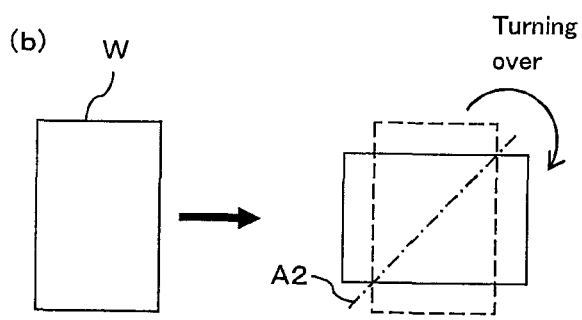
(b)
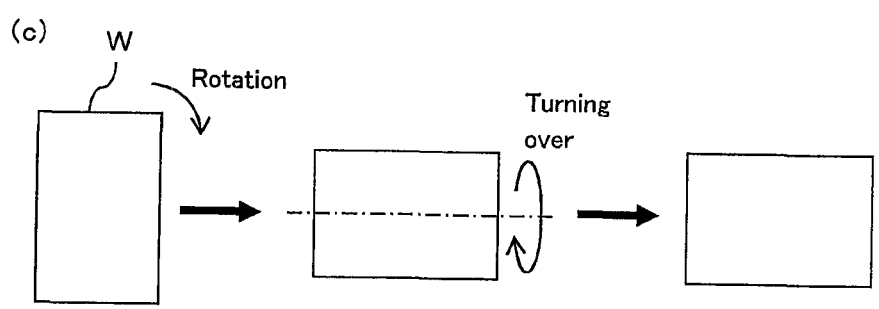
(c)
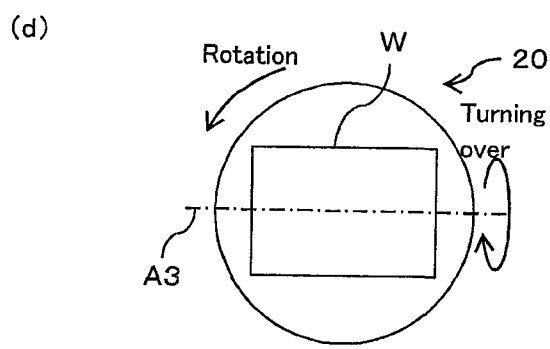
(d)

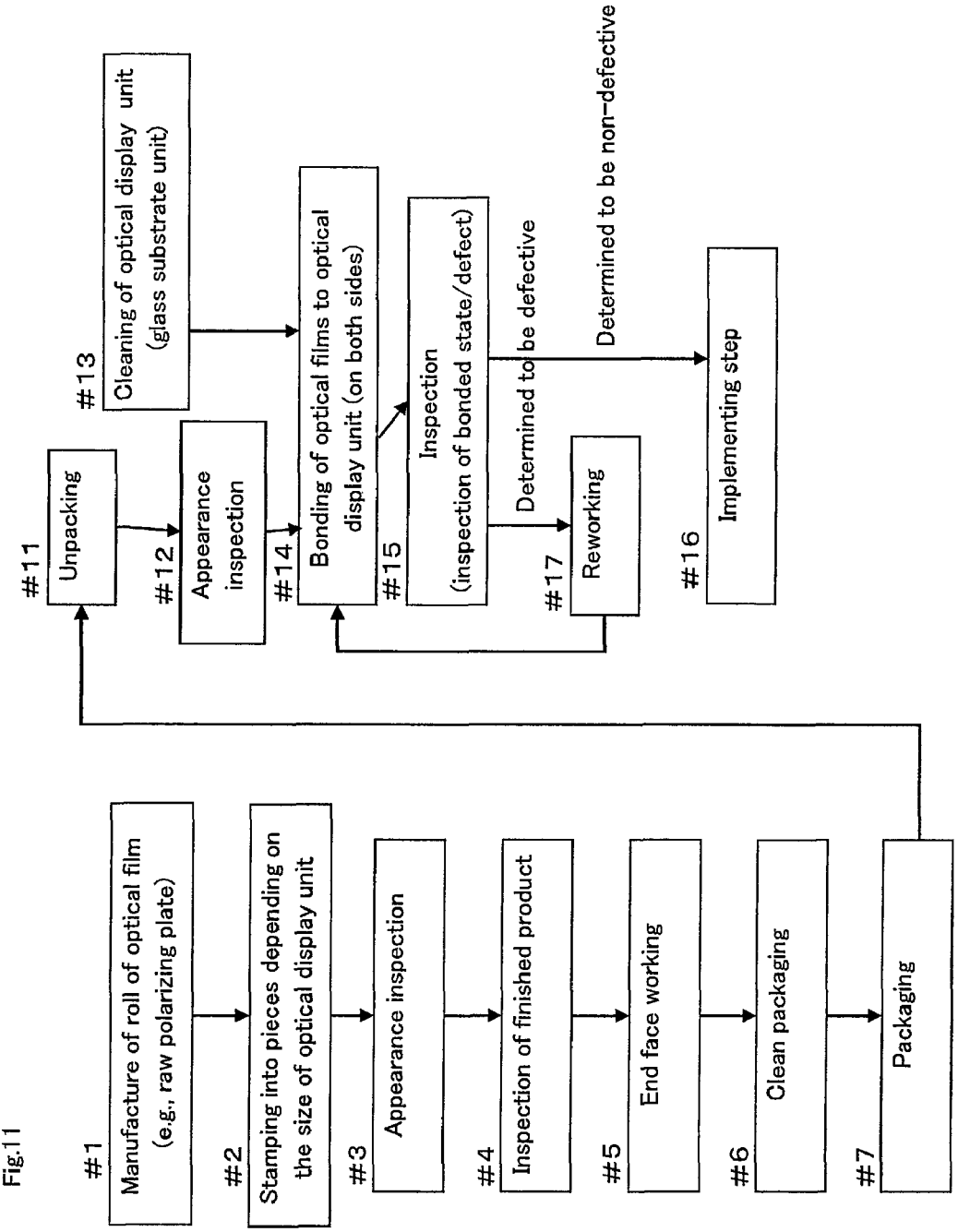

US 8,187,048 B2

SYSTEM AND METHOD FOR MANUFACTURING OPTICAL DISPLAY DEVICE

TECHNICAL FIELD

The invention relates to a system and a method for manufacturing an optical display device, which is for use in bonding optically-anisotropic optical films, such as polarizing plate-containing optical films, to one and the other surfaces of a rectangular optical display unit.

BACKGROUND ART

FIG. 11 schematically shows a conventional method for manufacturing an optical display unit to be incorporated into a liquid crystal display device. First, an optical film manufacturer produces a belt-shaped sheet material, which includes an optical film, in the form of a roll (#1). Specific processes for the manufacture thereof are known, and therefore a description thereof is omitted. The roll of the belt-shaped sheet material typically includes a raw polarizing plate, a raw retardation plate, or a raw laminated film of a polarizing plate and a retardation plate for use in the production of liquid crystal displays. The long material is then stamped into pieces of the sheet material having a shape according to the size of an optical display unit to which each piece will be bonded (#2). Each piece of the sheet material (optical film) obtained by the stamping is then subjected to an appearance inspection (#3). Examples of the inspection method include a visual inspection for defects and an inspection using a known defect inspection apparatus. The term "defect" typically means fouling of the surface or the inside, scratches, a foreign substance-containing defect with a special shape such as a dented and twisted shape (also called "knick"), bubbles, foreign substances, etc. The finished product is then inspected (#4). The finished product inspection is performed according to more strict quality criteria than those for the appearance inspection to determine whether the product is non-defective. Subsequently, the four end faces of each piece of the sheet material are worked (#5). The working is performed to prevent the pressure-sensitive adhesive or any other material from coming out of the end faces in transit. Each piece of the sheet material is then subjected to clean packaging in a clean room environment (#6). Subsequently, packaging for transportation (transport packaging) is performed (#7). Each piece of the sheet material manufactured as described above is transported to a panel processing manufacturer.

The panel processing manufacturer unpacks the piece of the material sheet transported (#11). An appearance inspection is then performed to check whether scratches, stains or other defects are produced in transit or during unpacking (#12). The piece of the sheet material determined to be non-defective by the inspection is then transferred to the next step. This appearance inspection may be omitted in some cases. The optical display unit (such as a glass substrate unit with a sealed liquid crystal cell) to which the piece of the sheet material will be bonded is previously manufactured and cleaned before the bonding step (#13).

The piece of the sheet material and the optical display unit are bonded together (#14). The release film is peeled off from the piece of the sheet material so that the pressure-sensitive adhesive can be left, and the bonding surface of the pressure-sensitive adhesive layer is attached to one side of the optical display unit. The other side of the optical display unit may also be subjected to a similar bonding process. The optical films to be bonded to both sides of the optical display unit may have the same structure or different structures. The optical display device having the bonded optical film is then subjected to an inspection and a defect inspection (#15). The optical display device determined to be non-defective by the inspection is transferred to an implementing process (#16). On the other hand, the optical display device determined to be defective is subjected to a reworking process (#17). In the reworking process, the optical film is peeled off from the optical display unit. A new optical film is bonded to the optical display unit having undergone the reworking process (#14).

The manufacturing process described above particularly requires the steps of working the end faces, packaging each piece of the sheet material, and unpacking the material, because the optical film manufacturer and the panel processing manufacturer are located at different places. However, such a multi-step process has the problem of an increase in manufacturing cost. There are also problems in which scratches, dust, stains, and the like can be caused by the multi-step process or the transportation so that an inspection process can be necessary, and problems in which different types of sheet materials must be carried and managed.

Japanese Patent Application Laid-Open (JP-A) No. 2007-140046 (Patent Document 1) discloses a system to solve the problems. The system includes means for drawing and feeding a belt-shaped sheet material from a roll of the belt-shaped sheet material including an optical film to be used as a component of an optical display device, means for detecting defects in the belt-shaped sheet material drawn from the feeding means, means for cutting the belt-shaped sheet material into sheet material pieces based on the result of the detection by the detecting means, means for transporting each sheet material piece cut by the cutting means to a bonding process, and means for bonding the transported sheet material piece to an optical display unit as a component of the optical display device, wherein the respective means are arranged on a continuous production line. In this system, the belt-shaped sheet material including the optical film can be directly cut into the desired size, and the cut piece of the sheet material can be directly bonded to the optical display unit. According to a conventional technique, the belt-shaped sheet material is stamped into pieces, and the stamped sheet material pieces are each carefully packaged and delivered to a panel processing manufacturer. According to this system, however, a roll of the belt-shaped sheet material can be directly packaged and delivered.

JP-A No. 2005-37417 (Patent Document 2) also discloses a configuration for drawing a belt-shaped film from a roll, cutting it and bonding the cut piece to a substrate (corresponding to the optical display unit).

PRIOR ART LITERATURE

Patent Document

Patent Document 1: Japanese Patent Application Laid-Open (JP-A) No. 2007-140046
Patent Document 2: Japanese Patent Application Laid-Open (JP-A) No. 2005-37417

SUMMARY OF THE INVENTION

Problems to be Solved by the Invention

However, the optical display device manufacturing system disclosed in Patent Document 1 does not include any additional apparatus for bonding another optical film to the other side of the optical display unit after the bonding of an optical film to one side of the optical display unit. Therefore, if the same manufacturing system is used to bond another optical film to the other side, loading the optical display unit on the system after the bonding results in double work, and there is a room for improvement.

When bonded to one and the other surfaces of an optical display unit, polarizing plates have different absorption axis directions (crossing each other at right angles) on the one and the other surfaces. In addition, it is generally difficult to produce a material roll having an absorption axis in the width direction of the roll, whereas the optical display unit generally has a rectangular shape. Considering these things, a satisfactory system configuration cannot be obtained by simply adding each of means for performing the process from the feeding of the belt-shaped sheet material to the bonding thereof to the manufacturing system disclosed in Patent Document 1.

Not only when polarizing plates are placed on one and the other surfaces, but also, for example, when retardation plates are placed on one and the other surfaces of the optical display unit, their slow axis directions on the one and the other surfaces have to be perpendicular to each other in some cases. Also in such cases, there is the same problem as in the case where polarizing plates are laminated.

In Patent Document 2, Embodiment 3 shows a configuration for drawing two belt-shaped films with different widths from rolls, respectively, cutting them, and bonding the cut pieces to both sides of a substrate (see paragraphs [0037] to [0044] and FIGS. 6 to 9). In Embodiment 3, two belt-shaped films are fed in directions perpendicular to each other so that cut pieces obtained by drawing and cutting these belt-shaped films can be bonded to both sides of the substrate in such a manner that the axis directions of the cut pieces are perpendicular to each other. However, such a configuration has the problem that the arrangement of the two belt-shaped films fed in directions perpendicular to each other makes the manufacturing system large.

It is therefore an object of the invention to provide a system and a method for manufacturing an optical display device, in which optical films can be bonded to one and the other surfaces of an optical display unit in such a manner that the optical anisotropy of the one is orthogonal to that of the other by using two material rolls that are the same in the direction of optical anisotropy, such as the direction of absorption axis.

Means for Solving the Problem

The above object can be achieved by the present inventions as follows. That is, a system for manufacturing an optical display device of the present invention is a system for manufacturing an optical display device comprising a rectangular optical display unit and an optical film bonded thereto including a polarizing plate, comprising:

an optical display unit feeding apparatus for feeding an optical display unit;

a first optical film feeding apparatus for drawing and feeding a belt-shaped sheet material comprising a first optical film from a roll of the belt-shaped sheet material;

a first cutting and bonding apparatus that comprises first bonding means for bonding the first optical film to one surface of the optical display unit, wherein the optical display unit is fed from the optical display unit feeding apparatus and the first optical film is fed from the first optical film feeding apparatus, and first cutting means for cutting the first optical film fed from the first optical film feeding apparatus;

a feeder for transporting and feeding the optical display unit after the bonding of the first optical film;

a second optical film feeding apparatus for drawing and feeding a belt-shaped sheet material comprising a second optical film from a roll of the belt-shaped sheet material, wherein the second optical film comprises a polarizing plate having an absorption axis in the same direction as that of a polarizing plate in the first optical film; and a second cutting and bonding apparatus that comprises second bonding means for bonding the second optical film to another surface of the optical display unit, wherein the optical display unit is fed from the feeder and the second optical film is fed from the second optical film feeding apparatus, and second cutting means for cutting the second optical film fed from the second optical film feeding apparatus, wherein one of the first and second cutting and bonding apparatuses is configured to cut an optical film with a width corresponding to a short side of the optical display unit into a length corresponding to a long side of the optical display unit, and the other of the first and second cutting and bonding apparatuses is configured to cut an optical film with a width corresponding to the long side of the optical display unit into a length corresponding to the short side of the optical display unit, and the feeder comprises a turning mechanism for turning the optical display unit to a bonding direction for the second cutting and bonding apparatus after the bonding in the first cutting and bonding apparatus.

In the optical display device manufacturing system of the invention, cut pieces of optical films with sizes corresponding to the short and long sides of the optical display unit can be obtained, respectively, only by cutting, at regular intervals, the optical film fed from each of a material roll with a width corresponding to the short side of the optical display unit and a material roll with a width corresponding to the long side of the optical display unit. Therefore, the former can be cut into a length corresponding to the long side and then bonded to one surface of the optical display unit, and the latter can be cut into a length corresponding to the short side and then bonded to the other surface of the optical display unit. Thus, when the two material rolls used have the same absorption axis direction, the optical films can be bonded to both surfaces of the optical display unit in such a manner that their optical axes are perpendicular to each other, which can increase the axis accuracy.

The presence of the turning mechanism makes it unnecessary to arrange the first and second optical film feed directions perpendicular to each other, which makes it possible to save the space of the manufacturing system. The turning mechanism also makes it possible to set a proper bonding angle for the second cutting and bonding apparatus. Specifically, higher turning position accuracy can be obtained when the optical display unit, which is harder than the optical film, is turned than when the flexible material such as the optical film is turned.

It is preferred that the first cutting and bonding apparatus is configured to bond the first optical film to one surface of the optical display unit by the first bonding means and then to cut the first optical film by the first cutting means, and the second cutting and bonding apparatus is configured to bond the second optical film to another surface of the optical display unit by the second bonding means and then to cut the second optical film by the second cutting means.

According to this feature, an optical film with a width corresponding to the short side of the optical display unit can be bonded to one surface of the optical display unit and then cut into a length corresponding to the long side of the optical display unit, and an optical film with a width corresponding to the long side of the optical display unit can be bonded to the other surface of the optical display unit and then cut into a length corresponding to the short side of the optical display unit. Therefore, when two material rolls that are the same in the direction of optical anisotropy, such as the direction of absorption axis, are used, optical films can be bonded to one and the other surfaces of the optical display unit in such a manner that the optical anisotropy of one of the optical films is orthogonal to that of the other optical film.

Also, a system for manufacturing an optical display device of the present invention is a system for manufacturing an optical display device comprising an optical display unit and an optically-anisotropic optical film bonded to the optical display unit, comprising:

a first cutting and bonding apparatus that is configured to handle a roll of a belt-shaped sheet material comprising a first optical film with a width corresponding to a short side of the optical display unit and also configured to bond the first optical film to one surface of the optical display unit and then to cut the first optical film into a length corresponding to a long side of the optical display unit; and a second cutting and bonding apparatus that is configured to handle a roll of a belt-shaped sheet material comprising a second optical film with a width corresponding to the long side of the optical display unit and also configured to bond the second optical film to another surface of the optical display unit and then to cut the second optical film into a length corresponding to the short side of the optical display unit.

In the optical display device manufacturing system of the invention, cut pieces of optical films with sizes corresponding to the short and long sides of the optical display unit can be obtained, respectively, only by cutting, at regular intervals, the optical film fed from each of a material roll with a width corresponding to the short side of the optical display unit and a material roll with a width corresponding to the long side of the optical display unit. Therefore, the former can be bonded to one surface of the optical display unit and then cut into a length corresponding to the long side, and the latter can be bonded to the other surface of the optical display unit and then cut into a length corresponding to the short side. Thus, when the two material rolls used are the same in the direction of optical anisotropy, such as the direction of absorption axis, the optical films can be bonded to one and the other surfaces of the optical display unit in such a manner that the optical anisotropy of one of the optical films is orthogonal to that of the other optical film.

On the other hand, a method for manufacturing an optical display device of the present invention is a method for manufacturing an optical display device comprising a rectangular optical display unit and an optical film bonded thereto including a polarizing plate, comprising:

an optical display unit feeding step comprising feeding an optical display unit;

a first optical film feeding step comprising drawing and feeding a belt-shaped sheet material comprising a first optical film from a roll of the belt-shaped sheet material;

a first cutting and bonding step that comprises a first bonding step comprising bonding the first optical film to one surface of the optical display unit, wherein the optical display unit is fed by the optical display unit feeding step and the first optical film is fed by the first optical film feeding step, and a first cutting step comprising cutting the first optical film fed by the first optical film feeding step;

a feeding step comprising transporting and feeding the optical display unit after the bonding of the first optical film;

a second optical film feeding step comprising drawing and feeding a belt-shaped sheet material comprising a second optical film from a roll of the belt-shaped sheet material, wherein the second optical film comprises a polarizing plate having an absorption axis in the same direction as that of a polarizing plate in the first optical film; and a second cutting and bonding step that comprises a second bonding step comprising bonding the second optical film to another surface of the optical display unit, wherein the optical display unit is fed by the feeding step and the second optical film is fed by the second optical film feeding step, and a second cutting step comprising cutting the second optical film fed by the second optical film feeding step, wherein one of the first and second cutting and bonding steps is performed to cut an optical film with a width corresponding to a short side of the optical display unit into a length corresponding to a long side of the optical display unit, and the other of the first and second cutting and bonding steps is performed to cut an optical film with a width corresponding to the long side of the optical display unit into a length corresponding to the short side of the optical display unit, and the feeding step comprises a turning step comprising turning the optical display unit to a bonding direction for the second cutting and bonding step after the bonding in the first cutting and bonding step.

In the optical display device manufacturing method of the invention, cut pieces of optical films with sizes corresponding to the short and long sides of the optical display unit can be obtained, respectively, only by cutting, at regular intervals, the optical film fed from each of a material roll with a width corresponding to the short side of the optical display unit and a material roll with a width corresponding to the long side of the optical display unit. Therefore, the former can be cut into a length corresponding to the long side and then bonded to one surface of the optical display unit, and the latter can be cut into a length corresponding to the short side and then bonded to the other surface of the optical display unit. Thus, when the two material rolls used have the same absorption axis direction, the optical films can be bonded to both surfaces of the optical display unit in such a manner that their optical axes are perpendicular to each other, which can increase the axis accuracy.

The presence of the turning step makes it unnecessary to arrange the first and second optical film feed directions perpendicular to each other, which makes it possible to save the space of the manufacturing system. The turning step also makes it possible to set a proper bonding angle for the second cutting and bonding apparatus. Specifically, higher turning position accuracy can be obtained when the optical display unit, which is harder than the optical film, is turned than when the flexible material such as the optical film is turned.

It is preferred that the first cutting and bonding step is performed to bond the first optical film to one surface of the optical display unit by the first bonding step and then to cut the first optical film by the first cutting step, and the second cutting and bonding step is performed to bond the second optical film to another surface of the optical display unit by the second bonding step and then to cut the second optical film by the second cutting step. According to this feature, an optical film with a width corresponding to the short side of the optical display unit can be bonded to one surface of the optical display unit and then cut into a length corresponding to the long side of the optical display unit, and an optical film with a width corresponding to the long side of the optical display unit can be bonded to the other surface of the optical display unit and then cut into a length corresponding to the short side of the optical display unit. Therefore, when two material rolls that are the same in the direction of optical anisotropy, such as the direction of absorption axis, are used, optical films can be bonded to one and the other surfaces of the optical display unit in such a manner that the optical anisotropy of one of the optical films is orthogonal to that of the other optical film.

Also, a method for manufacturing an optical display device of the present invention is a method for manufacturing an optical display device comprising an optical display unit and an optically-anisotropic optical film bonded to the optical display unit, comprising:

a first cutting and bonding step that comprises providing a roll of a belt-shaped sheet material comprising a first optical film with a width corresponding to a short side of the optical display unit, boding the first optical film to one surface of the optical display unit, and then cutting the first optical film into a length corresponding to a long side of the optical display unit; and a second cutting and bonding step that comprises providing a roll of a belt-shaped sheet material comprising a second optical film with a width corresponding to the long side of the optical display unit, bonding the second optical film to another surface of the optical display unit, and then cutting the second optical film into a length corresponding to the short side of the optical display unit.

When the optical display device manufacturing method of the invention is performed using a material roll with a width corresponding to the short side of the optical display unit and a material roll with a width corresponding to the long side of the optical display unit, the former is bonded to one surface of the optical display unit and then cut into a length corresponding to the long side, and the latter is bonded to the other surface of the optical display unit and then cut into a length corresponding to the short side. Therefore, when two material rolls that are the same in the direction of optical anisotropy, such as the direction of absorption axis are used, optical films can be bonded to one and the other surfaces of the optical display unit in such a manner that the optical anisotropy of one of the optical films is orthogonal to that of the other optical film.

BRIEF DESCRIPTION OF DRAWINGS

FIGS. 10 (*a-d*) are schematic diagrams showing specific examples of the methods of turning the optical display unit over and by 90°.

FIG. 11 is a flow chart of a conventional optical display device manufacturing method.

EMBODIMENTS FOR CARRYING OUT THE INVENTION

Figure 1:
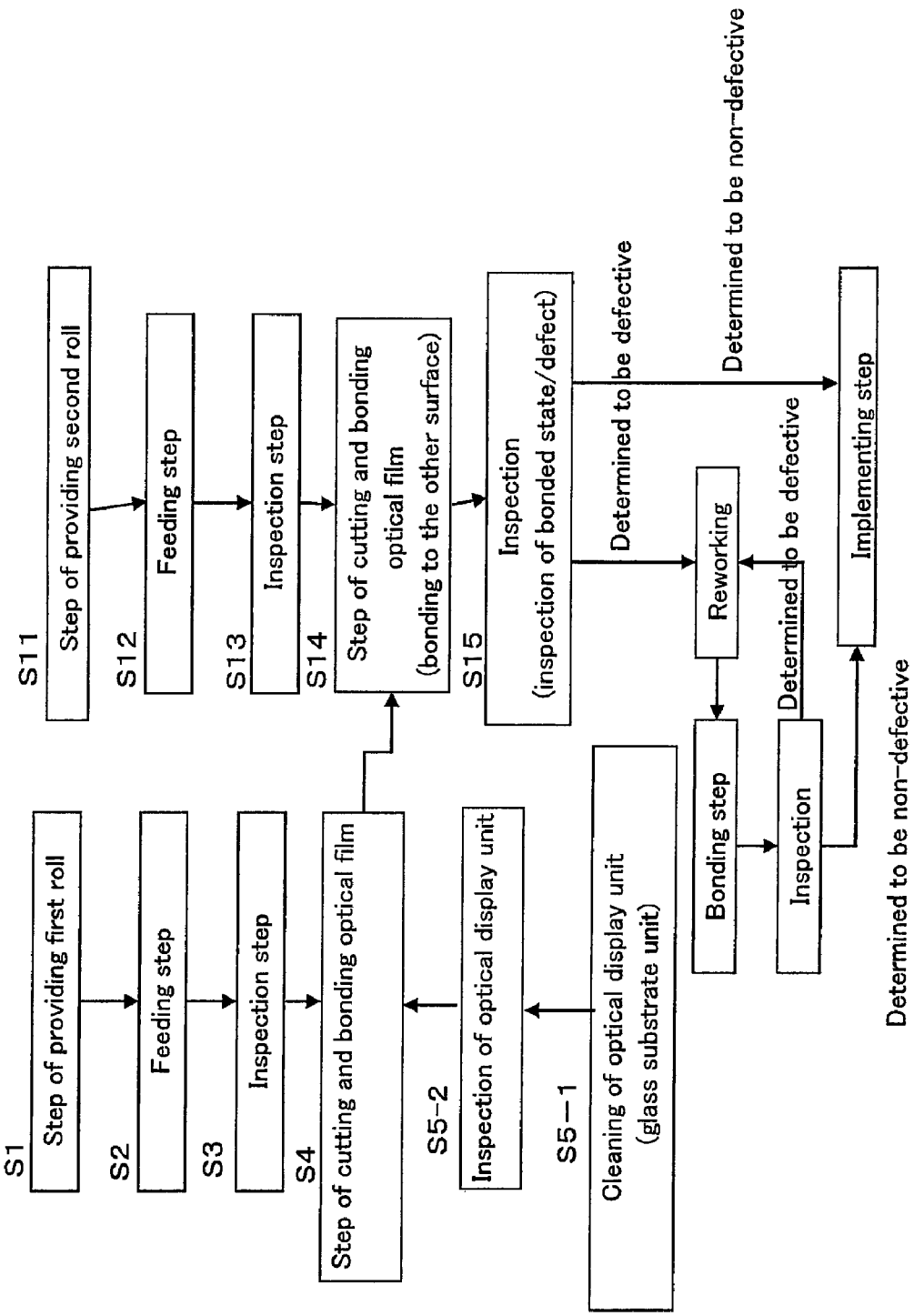
FIG. 1 is a flow chart showing a process performed using the manufacturing system of the invention.
Figure 2:
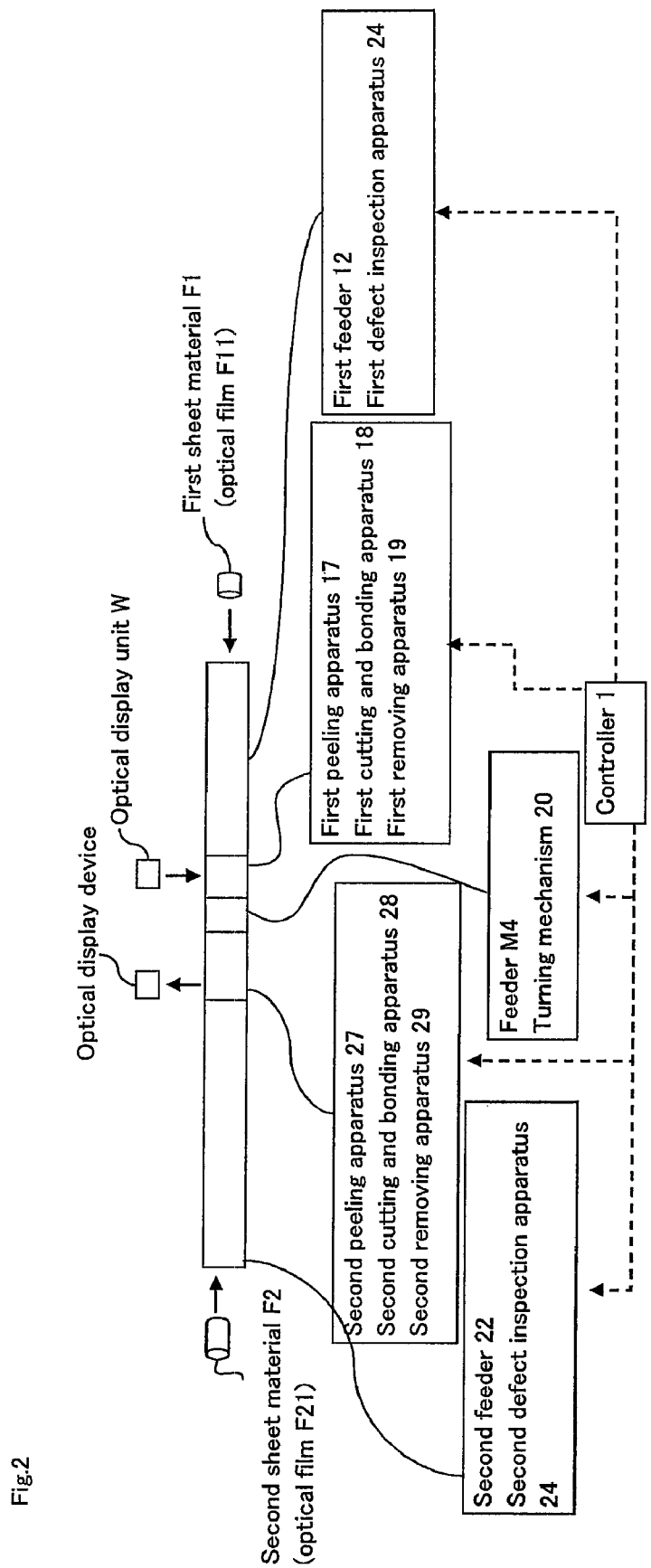
FIG. 2 is a diagram for illustrating an example of the manufacturing system of the invention.
Figure 3:
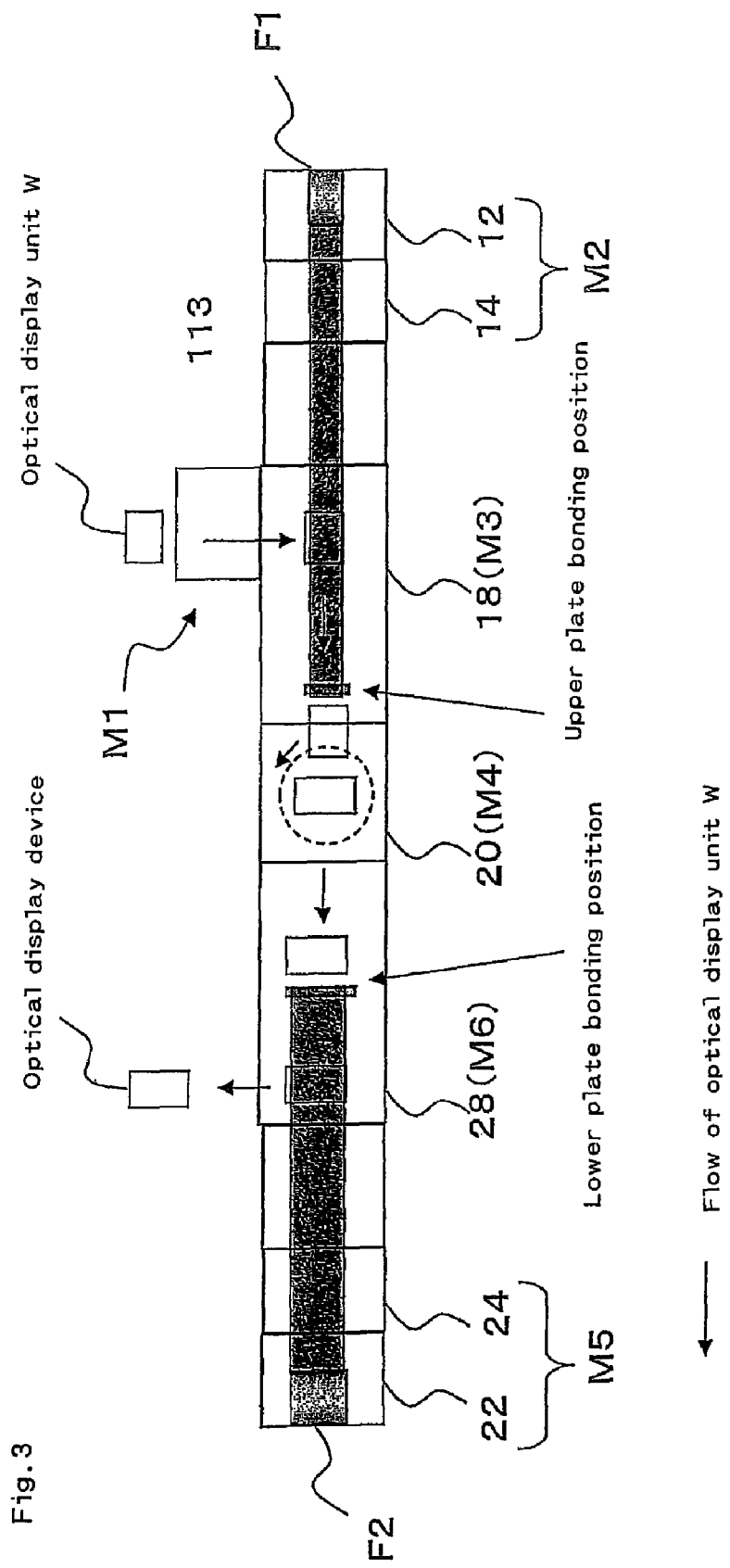
FIG. 3 is a diagram for illustrating an example of the manufacturing system of the invention.

Embodiments of the invention are described below in the order of materials used in the optical display device manufacturing system, manufacturing process flow, and the structure of each component of the manufacturing system. FIG. 1 shows an example of the flow chart of the optical display device manufacturing method. FIG. 2 is a schematic diagram showing an example of the optical display device manufacturing system. FIG. 3 is a layout plan view showing an example of the optical display device manufacturing system.

Optical Display Unit

The optical display unit for use in an embodiment of the invention is intended to include any assembly of parts for displaying characters or images. The optical display unit is typically a liquid crystal cell, an organic electroluminescence panel, or the like. The invention is effective when using an optical display unit having a rectangular outline shape, such as that with a long side/short side ratio of 16/9 or 4/3. The optical display unit may also have such a member as an optical film that is previously integrated as part of the laminated structure.

Optical Film

The optical film to be bonded to the optical display unit may be a monolayer film or a multilayer film. The optical film has at least one optically anisotropic layer. The term "optically anisotropic" or "optical anisotropy" means that the in-plane optical properties are not uniform, and examples of optical anisotropy include absorption anisotropy, refractive index anisotropy, and reflection anisotropy. The optical film is typically a polarizing plate having an absorption axis, a retardation film having a slow axis, a brightness enhancement film having a transmission axis, or a laminate thereof.

The belt-shaped sheet material for use in an embodiment of the invention is intended to include a long sheet that is processed to have a width corresponding to the short or long side of the optical display unit and is sufficiently longer in the longitudinal direction than in the width direction. For example, the length of the belt-shaped sheet material is 10 times or more the width. The belt-shaped sheet material may be any material containing the optical film. The belt-shaped sheet material preferably includes a polarizing plate-containing optical film, a pressure-sensitive adhesive layer, and a release film, which are provided in this order.

The material roll or the roll for use in an embodiment of the invention is a roll of the belt-shaped sheet material. The material roll is usually obtained by winding the belt-shaped sheet material around a roll core from one end thereof.

For example, the optical film including the polarizing plate may be a polarizing plate or an optical film including a laminate of a polarizing plate and a retardation film, a brightness enhancement film, or a combination of two or more of these films.

A protective transparent film is sometimes placed on the surface of any of these optical films. For example, a pressure-sensitive adhesive layer is preferably formed on one surface of the optical film so that the optical film can be bonded to the optical display unit, and a release film should be provided to protect the pressure-sensitive adhesive layer. A surface protecting film may be provided on the other surface of the optical film, for example, with a pressure-sensitive adhesive layer interposed therebetween.

The invention is effective when using two material rolls having optical anisotropy in the same direction, particularly using two material rolls in which the absorption axes of polarizing plates in optical films are in the same direction. The direction of the absorption axis of the polarizing plate is generally in the longitudinal direction of the material roll. When a retardation film is used, the slow axis of the retardation film may be parallel or perpendicular to the longitudinal direction of the material roll or oblique to the longitudinal direction of the material roll by a certain angle. Hereinafter, the optical film including a laminate of the surface protecting film and the release film is also referred to as a sheet material.

Preferably, the long polarizing plate as a component of the material roll has been stretched in the longitudinal direction and therefore has an absorption axis parallel to the longitudinal direction. When the polarizing plate having an absorption axis parallel to the longitudinal direction is used, the polarizing plate can be bonded to the optical display unit with improved axis accuracy, so that the optical display device obtained after the bonding can have good optical properties.

Manufacturing Flow Chart

The optical display device manufacturing method of the invention is a method for manufacturing an optical display device including an optical display unit and an optically anisotropic optical film bonded to the optical display unit, preferably a method for manufacturing an optical display device including an optical display unit and a polarizing plate-containing optical film bonded to the optical display unit.

The manufacturing method of the invention includes a first cutting and bonding step and a second cutting and bonding step, in which the steps may be performed in any order or at the same time or substantially at the same time.

The first cutting and bonding step is performed using a roll of a belt-shaped sheet material including a first optical film with a width corresponding to the short side of the optical display unit. The first cutting and bonding step may include bonding the first optical film to one surface of the optical display unit and then cutting the first optical film into a piece with a length corresponding to the long side of the optical display unit or may include cutting the first optical film into a piece with a length corresponding to the long side of the optical display unit and then bonding the piece to one surface of the optical display unit.

The second cutting and bonding step is performed using a roll of a belt-shaped sheet material including a second optical film with a width corresponding to the long side of the optical display unit. The second cutting and bonding step may include bonding the second optical film to the other surface of the optical display unit and then cutting the second optical film into a piece with a length corresponding to the short side of the optical display unit or may include cutting the second optical film into a piece with a length corresponding to the short side of the optical display unit and then bonding the piece to the other surface of the optical display unit.

More specifically, for example, the method for manufacturing an optical display device according to an embodiment of the invention includes: a first cutting and bonding step including bonding a first optical film to one surface of an optical display unit, while drawing and feeding a belt-shaped sheet material including the first optical film from a roll of the belt-shaped sheet material and then cutting the first optical film into a predetermined length; and a second cutting and bonding step including bonding a second optical film to the other surface of the optical display unit, while drawing and feeding a belt-shaped sheet material including the second optical film from a roll of the belt-shaped sheet material and then cutting the second optical film into a predetermined length.

For example, the first cutting and bonding step may be performed by the process from (2) Feeding Step to (4) First Optical Film Cutting and Bonding Step described below. For example, the second cutting and bonding step may be performed by the process from (7) Feeding Step to (9) Second Optical Film Cutting and Bonding Step described below.

(1) Step of Providing First Material Roll (S1 in FIG. 1). A first roll of a first belt-shaped sheet material is provided. The width of the first roll depends on the size of the optical display unit to be bonded. More specifically, the width of the first roll is determined to correspond to one of the long and short sides of the optical display unit, and the width of the second roll is determined to correspond to the other. Therefore, the first and second rolls have different widths, and material rolls having undergone no slitting process (unslit materials rolls) are each previously subjected to a slitting process so as to have a predetermined width, and the materials with the predetermined widths are used.

Preferably, the long polarizing plate as a component of the roll having undergone no slitting process (unslit roll) has been stretched in the longitudinal direction and therefore has an absorption axis parallel to the longitudinal direction. In this case, the material roll is preferably manufactured by a process including subjecting the long material being drawn from the unslit roll to a slitting process in a direction parallel to the longitudinal direction of the long material and winding, into a roll, the belt-shaped sheet material obtained by the slitting process. In this case, the belt-shaped sheet material being drawn from the material roll can be bonded to the optical display unit with improved axis accuracy, so that the optical display device obtained after the bonding can have good optical properties. The slitting process may be performed, while the unslit roll is unwound. The slitting process may be performed by a method using a laser cutter or an edge tool such as a rotary circular knife. The material roll may be produced not only by the process of slitting the long material being drawn from the unslit roll but also, for example, by a process that includes subjecting the long material being continuously produced to a slitting process in a direction parallel to the longitudinal direction and winding, into a roll, the belt-shaped material obtained by the slitting process. Alternatively, the material roll may be produced using a method of cutting one or both ends of the unslit roll without unwinding the roll.

As used herein, the expression "to correspond to the long or short side of the optical display unit" means that the bonding length of the optical film (exclusive of the length of the exposed portion) will correspond to the length of the long or short side of the optical display unit and does not mean that the width of the optical film has to be equal to the length of the long or short side of the optical display unit.

Figure 4:
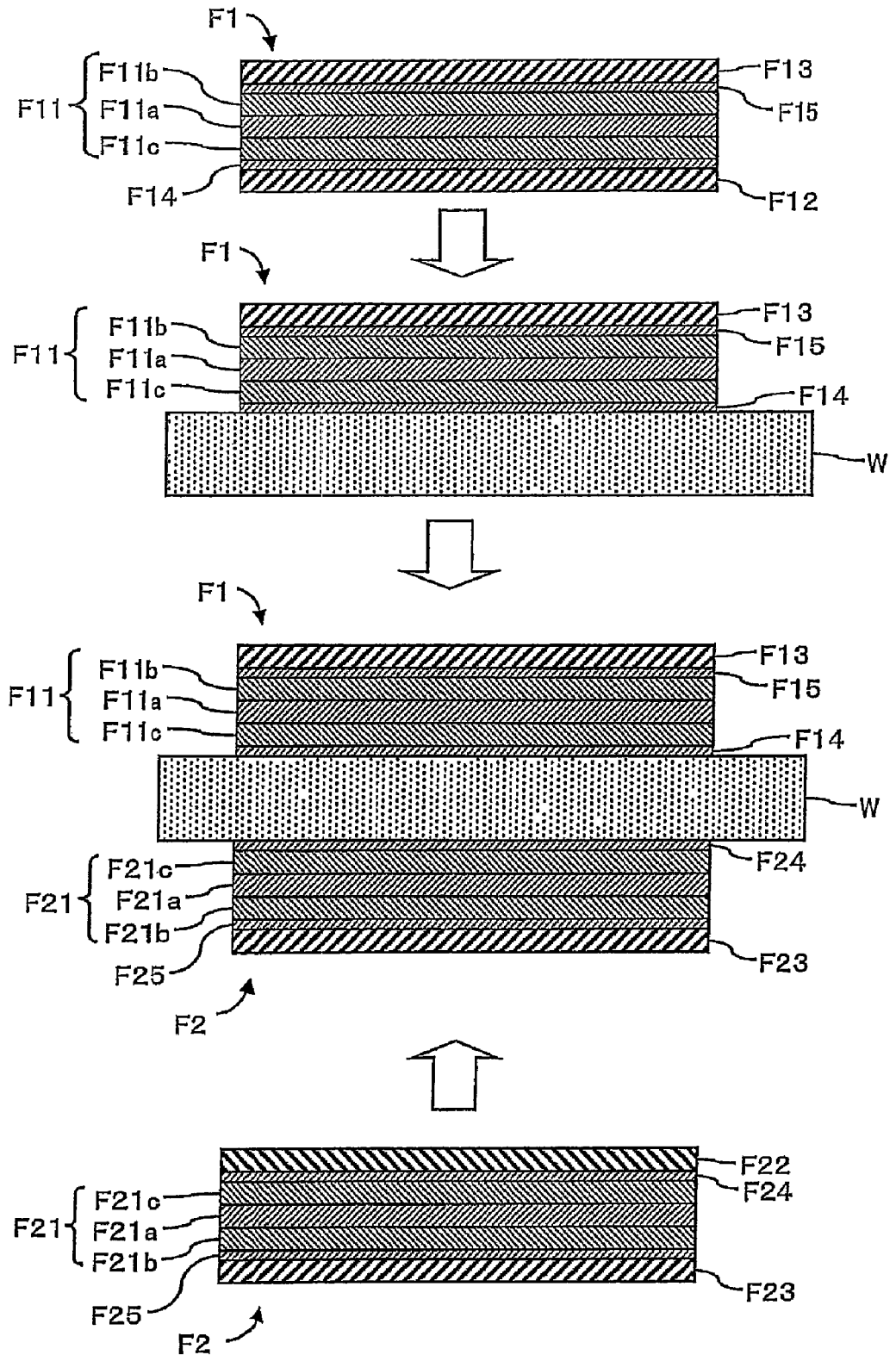
FIG. 4 is a diagram for illustrating an example of the laminated structure of first and second optical films.

As shown in FIG. 4, for example, the laminated structure of the first sheet material F1 includes a first optical film F11, a first release film F12, and a surface protecting film F13. The first optical film F11 includes a first polarizer F11a, a first film F11b provided on one side thereof with an adhesive layer (not shown) interposed therebetween, and a second film F11c provided on the other side thereof with an adhesive layer (not shown) interposed therebetween.

For example, the first and second films F11b and F11c are polarizer protecting films (such as triacetylcellulose films or PET films). The second film F11c is to be bonded to the surface of the optical display unit W with a first pressure-sensitive adhesive layer F14 interposed therebetween. The first film F11b may undergo a surface treatment. Examples of the surface treatment include a hard coating treatment, an antireflection treatment, and a treatment for any other purpose such as anti-sticking, diffusion or antiglare purpose. The first release film F12 is provided on the second film F11c with a first pressure-sensitive adhesive layer F14 interposed therebetween. The surface protecting film F13 is provided on the first film F11b with a pressure-sensitive adhesive layer F15 interposed therebetween. Hereinafter, a laminated structure of a polarizer and a polarizer protecting film is also referred to as a polarizing plate.

In a factory, each step described below is performed in an isolated structure preferably with cleanliness maintained. In particular, cleanliness is preferably maintained in the step of bonding the optical film to the optical display unit.

(2) Feeding Step (S2 in FIG. 1). The first sheet material F1 is fed to the downstream side from the first roll provided and placed. For example, a first feeder 12 to feed the first sheet material F1 includes a pair of nip rollers, a tension roller, a rotary drive, an accumulator, a sensor, a controller, and any other unit.

(3) First Inspection Step (S3 in FIG. 1). The first sheet material F1 is inspected for defects using a first defect inspection apparatus 14. The defect inspection method may be a method of performing imaging and image processing on both sides of the first sheet material F1 with transmitted light or reflected light, a method of performing imaging and image processing with a polarizing film for inspection arranged in a crossed nicols relationship (also referred to as "0° cross") with the polarization axis of the polarizing plate (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing plate (the object to be inspected) between a CCD camera and the object. Known methods may be used for the image processing algorithm. For example, defects may be detected by grayscale determination based on binarization.

The method of performing imaging and image processing with transmitted light allows the detection of contaminants in the first sheet material F1. The method of performing imaging and image processing with reflected light allows the detection of contaminants deposited on the surface of the first sheet material F1. In the method of performing imaging and image processing with 0° cross, surface contaminants, dirt, and interior contaminants can generally be detected as bright spots. In the method of performing imaging and image processing with X° cross, knicks can generally be detected.

Defect information detected by the first defect inspection apparatus 14 is associated with the positional information (such as position coordinates) and sent to a controller 1 so that it can contribute to the process with a first cutting and bonding apparatus 18 as described below.

(4) Step of Cutting and Bonding First Optical Film (S4 in FIG. 1). While the first release film F12 is removed using a first peeling apparatus 17, the first optical film F11 separated from the first release film F12 is bonded to an optical display unit W with the first pressure-sensitive adhesive layer F14 interposed therebetween, and then the first optical film F11 is cut into a piece. In the bonding, the first optical film F11 and the optical display unit W are press-bonded to each other between a pair of rolls as described below. The bonding is performed based on the defect information detected by the first defect inspection apparatus 14 so that defects are avoided and that the defect-free region of the first optical film F11 is bonded to the optical display unit W. This significantly increases the first sheet material F1 yield. Such defect information for use in the bonding may be detected by an in-line defect inspection apparatus or attached to the material roll in advance.

The first cutting and bonding apparatus 18 has cutting means for cutting the surface protecting film F13, the pressure-sensitive adhesive layer F15, the first optical film F11, and the first pressure-sensitive adhesive layer F14. The length of the cut piece typically corresponds to the long or short side of the optical display unit. For example, when the first roll has a width corresponding to the short side, the optical film is cut into a length corresponding to the long side, and when the first roll has a width corresponding to the long side, the optical film is cut into a length corresponding to the short side. This embodiment as shown in FIG. 3 shows an example where the first roll (first sheet material F1) has a width corresponding to the short side of the optical display unit W.

For example, the cutting means may be a laser, a cutter, or any other known cutting means. The cutting is performed between the adjacent optical display units W, and the portion of the first sheet material F1, which is not bonded to the optical display unit W, is removed by a first removing apparatus 19 as described below.

(5-1) Cleaning Step (S5-1 in FIG. 1). The surface of the optical display unit W is cleaned by polishing cleaning, water cleaning or any other cleaning techniques. The cleaned optical display unit W is transported to an inspection apparatus.

(5-2) Inspecting Step (S5-2 in FIG. 1). After the cleaning, the surface of the optical display unit W is inspected using an inspection apparatus. After the inspection, the optical display unit W is transported to the first bonding apparatus 18.

All of the step of providing the first roll, the first inspection step, the step of cutting and bonding the first optical film, the cleaning step, and the inspection step are preferably performed in a continuous manufacturing line. A description is given below of the manufacturing step in which the second optical film F21 is bonded to the other side.

(6) Step of Providing Second Material Roll (S11 in FIG. 1). A second roll of a second belt-shaped sheet material F2 is provided. As shown in FIG. 4, the laminated structure of the second sheet material F2 is typically, but not limited to, the same as that of the first sheet material. The second sheet material F2 includes a second optical film F21, a second release film F22, and a surface protecting film F23. The second optical film F21 includes a second polarizer 21a, a third film F21b provided on one side of the polarizer 21a with an adhesive layer (not shown) interposed therebetween, and a fourth film F21c provided on the other side with an adhesive layer (not shown) interposed therebetween.

For example, the third and fourth films F21b and F21c are each a polarizer protecting film (such as a triacetylcellulose film or a PET film). The fourth film F21c is to be bonded to the surface of the optical display unit W with a second pressure-sensitive adhesive layer F24 interposed therebetween. The third film F21b may undergo a surface treatment. Examples of the surface treatment include a hard coating treatment, an antireflection treatment, and a treatment for any other purpose such as anti-sticking, diffusion or antiglare purpose. The second release film F22 is provided on the fourth film F21c with a second pressure-sensitive adhesive layer F24 interposed therebetween. The surface protecting film F23 is provided on the third film F21b with a pressure-sensitive adhesive layer F25 interposed therebetween.

(7) Feeding Step (S12 in FIG. 1). The second sheet material F2 is fed to the downstream side from the second roll provided and placed. For example, a second feeder 22 to feed the second sheet material F2 includes a pair of nip rollers, a tension roller, a rotary drive, an accumulator, a sensor, a controller, and any other unit.

(8) Second Inspection Step (S13 in FIG. 1). The second sheet material F2 is inspected for defects using a second defect inspection apparatus 24. In this step, the defect inspection method is the same as the method using the first defect inspection apparatus.

(9) Step of Cutting and Bonding Second Optical Film (S14 in FIG. 1). Subsequently, while the second release film F22 is removed using a second peeling apparatus 27, the second optical film F21 separated from the second release film F22 is bonded to the other surface of the optical display unit W (than the surface to which the first optical film F11 is bonded) with the second pressure-sensitive adhesive layer F24 interposed therebetween, and then the second optical film F21 is cut into a piece. The bonding is performed based on the defect information detected by the second defect inspection apparatus 24 so that defects are avoided and that the defect-free region of the second optical film F21 is bonded to the optical display unit W. This significantly increases the second sheet material F2 yield. Such defect information for use in the bonding may be detected by an in-line defect inspection apparatus or attached to the material roll in advance. Before the second optical film F21 is bonded to the optical display unit W, the optical display unit W may be turned by 90° using the feed direction-switching mechanism of the feeding mechanism so that the first and second optical films F11 and F21 can have a crossed Nicols relationship.

In an embodiment of the invention, the method preferably includes the step of turning (including turning over and rotating) the optical display unit W to the direction of bonding in the step of cutting and bonding the second optical film after the step of cutting and bonding the first optical film. In a preferred embodiment of the invention, the turning step is performed so that the direction of the long side of the first optical film F11 bonded to the optical display unit W can make an angle of 0±5°, preferably 0±1°, with the direction of the long side of the second optical film F21 to be bonded to the optical display unit W. For example, when the direction of the first optical film F11-feeding line is parallel to the direction of the second optical film F21-feeding line (including when they are on a straight line), the turning angle in the turning step is preferably from 85 to 95°. In the bonding, the second optical film F21 and the optical display unit W may be press-bonded between rolls as described below.

The second cutting and bonding apparatus 28 has cutting means for cutting the surface protecting film F23, the pressure-sensitive adhesive layer F25, the second optical film F21, and the second pressure-sensitive adhesive layer F24. Specifically, the length of the cut piece corresponds to the long or short side of the optical display unit. For example, when the second roll has a width corresponding to the short side, the optical film is cut into a length corresponding to the long side, and when the second roll has a width corresponding to the long side, the optical film is cut into a length corresponding to the short side. This embodiment as shown in FIG. 3 shows an example where the second roll (second sheet material F2) has a width corresponding to the long side of the optical display unit W.

For example, the cutting means may be a laser, a cutter, or any other known cutting means. The cutting is performed between the adjacent optical display units W, and the portion of the second sheet material F2, which is not bonded to the optical display unit W, is removed by a second removing apparatus 29 as described below.

(10) Step of Inspecting Optical Display Device (S14 in FIG. 1). An inspection apparatus is used to inspect an optical display device including the optical display unit W and the optical films bonded to both sides of the optical display unit W. An example of the inspection method is a method of performing imaging and image processing with reflected light on both sides of the optical display device. Another example of the method uses a polarizing film for inspection placed between a CCD camera and the object to be inspected. Known methods may be used for the image processing algorithm. For example, defects may be detected by grayscale determination based on binarization.

(11) Defect information obtained by the inspection apparatus is used to determine whether the optical display device is non-defective. The optical display device determined to be non-defective is transferred to the next implementing process. When determined to be defective, it is subjected to a reworking process, in which a new optical film is bonded, and then the product is inspected. The product determined to be non-defective is transferred to the implementing process, but the product determined to be defective is subjected to the rewording process again or to disposal.

In the above series of manufacturing steps, the first optical film F11 cutting and bonding step and the second optical film F21 cutting and bonding step may be performed in a continuous manufacturing line, which makes it possible to manufacture the optical display device in a satisfactory manner.

Another Mode of Defect-Skipping Bonding Method

Another mode of the steps of cutting and bonding the first and second optical films is described below. This mode is particularly effective when the first and second inspection steps are absent. Information about defects in each of the first and second sheet materials (such as coordinates of defects, defect type, and defect size) may be attached as coded information (such as QR codes or bar codes) to one transverse end portion of each of the first and second rolls at predetermined intervals (e.g., 1,000 mm). In such a case, the coded information may be read and analyzed at a stage before the bonding of the optical film, and then in each of the steps of cutting and bonding the first and second optical films, the optical film may be bonded to the optical display unit in such a manner that the defect portions are avoided. The system may be configured so that the defect-containing portion can be removed or bonded to a certain member other than the optical display unit and that the piece of the sheet material bonded to the optical display unit can be determined to be non-defective. This significantly increases the yields of the optical films F11 and F21.

Configuration of the Whole of Manufacturing System

Next, a description is given of the configuration of the whole of the manufacturing system of the invention. The manufacturing system of the invention is a system for manufacturing an optical display device including an optical display unit and an optically-anisotropic optical film bonded thereto, preferably a system for manufacturing an optical display device including an optical display unit and an optical film that includes a polarizing plate and is bonded to the optical display unit. The manufacturing system of the invention includes a first cutting and bonding apparatus for performing the step of cutting and bonding the first optical film and a second cutting and bonding apparatus for performing the step of cutting and bonding the second optical film.

This embodiment, as shown in FIG. 3, shows an example where the system includes an optical display unit W feeding apparatus M1, a first optical film F11 feeding apparatus M2, a first cutting and bonding apparatus M3 for bonding the first optical film F11 and then cutting it, a feeder M4 for transporting and feeding the optical display unit W after the bonding, a second optical film F21 feeding apparatus M5, and a second cutting and bonding apparatus M6 for bonding the second optical film F21 and then cutting it.

Concerning this embodiment, FIG. 3 shows an example where the first optical film F11 feeding apparatus M2, the first cutting and bonding apparatus M3, the transporting and feeding apparatus M4, the second optical film F21 feeding apparatus M5, and the second cutting and bonding apparatus M6 are linearly arranged, and the feeding apparatus M1 is placed so that the optical display unit W can be fed in a direction perpendicular to the direction of the flow of the optical display unit W in the first cutting and bonding apparatus M3.

Configuration of Each Section in the Manufacturing System

An example of the configuration of each section in the manufacturing system of the invention is described below.

The manufacturing system of the invention includes the optical display unit W feeding apparatus M1 for feeding the optical display unit W.

The manufacturing system of the invention includes the first optical film feeding apparatus M2 for drawing and feeding the first sheet material F1 from a roll of the first sheet material F1 including the first optical film F11. This embodiment shows an example where the first optical film feeding apparatus M2 includes a first feeder 12, a first pre-inspection peeling apparatus, a first defect inspection apparatus 14, and a first release film bonding apparatus. In an embodiment of the invention, the presence of the first pre-inspection peeling apparatus, the first defect inspection apparatus 14, and the first release film bonding apparatus allows high accuracy inspection of the first optical film. Alternatively, however, these apparatuses may be omitted.

The first roll of the first belt-shaped sheet material F1 is mounted on a roll mount apparatus that is geared to a motor or the like to rotate freely or at a certain speed. A controller 1 is provided to set the rotational speed and to control the drive.

The first feeder 12 is a feeding mechanism to feed the first sheet material F1 to the downstream side. The first feeder 12 is controlled by the controller 1.

The first pre-inspection peeling apparatus is configured to peel off the first release film F12 from the first sheet material F1 being fed and to wind the first release film F12 around a roll. The speed of winding it onto the roll is controlled by the controller 1. The peeling mechanism is configured so that the first release film F12 can be peeled off by reversing the feed direction of the first release film F12 and that the portion of the first sheet material F1 separated from the first release film F12 can be fed in the original feed direction.

The first defect inspection apparatus 14 inspects defects after the separation of the first release film F12. The first defect inspection apparatus 14 has a CCD camera, in which image data taken by the CCD camera is analyzed so that defects are detected and their position coordinates are calculated. The defect position coordinates are used in the process with the first cutting and bonding apparatus 18 as described below.

After the first defect inspection, the first release film bonding apparatus bonds the release film F12 to the first optical film F11 with the first pressure-sensitive adhesive layer F14 interposed therebetween. The release film F12 is unwound from the roll of the release film F12, and the release film F12 and the first optical film F11 are inserted between one or more pairs of rollers so that they are bonded to each other under a certain pressure from the pair of rollers. The rotational speed of the pair of rollers, the pressure, and the feeding are controlled by the controller 1.

The manufacturing system of the invention includes the first cutting and bonding apparatus 18 (M3) for bonding the first optical film F11 to one surface of the optical display unit W, wherein the optical display unit W is fed from the optical display unit W feeding apparatus M1, and the first optical film F11 is fed from the first film feeding apparatus M2. In an embodiment of the invention, the first cutting and bonding apparatus 18 is configured to bond the first optical film F11 to one surface of the optical display unit W and then to cut the optical film into a length corresponding to the long or short side of the optical display unit, wherein when the optical film has a width corresponding to the short side, it is configured to cut the optical film into a length corresponding to the long side, and when the optical film has a width corresponding to the long side, it is configured to cut the optical film into a length corresponding to the short side. This embodiment shows an example where the first cutting and bonding apparatus 18 is configured to cut the optical film with a width corresponding to the short side of the optical display unit into a length corresponding to the long side. This embodiment also shows an example where the first cutting and bonding apparatus 18 includes a press roller and a guide roller and further includes a first peeling apparatus 17 and a first removing apparatus 19. The first removing apparatus 19 has a defective portion removing mechanism for removing defective portions from the optical film without bonding the portions to the optical display unit W when the first cutting and bonding apparatus 18 operates. Alternatively, however, such a removing mechanism may be omitted.

The first cutting and bonding apparatus 18 bonds part of the first sheet material F1 (the first optical film F11), from which the release film F12 has been peeled off by the first peeling apparatus 17, to the optical display unit W with the first pressure-sensitive adhesive layer F14 interposed therebetween. The first sheet material F1 feeding route is placed above the optical display unit W feeding route.

In the bonding process, the first optical film F11 is bonded to the surface of the optical display unit W, while it is pressed against the surface by the press roller and the guide roller. The pressure from the press roller and the guide roller and the driving operation thereof are controlled by the controller 1.

The first peeling apparatus 17 has a peeling mechanism that is configured so that the first release film F12 can be peeled off by reversing the feeding direction of the first release film F12 and that part of the first sheet material F1 (the first optical film F11) peeled off from the first release film F12 can be fed to the surface of the optical display unit W. After peeled off, the release film F12 is wound around a roll. The winding around the roll is controlled by the controller 1.

The bonding mechanism includes a press roller and a guide roller opposed thereto, which are provided at the bonding position. The guide roller comprises a rubber roller whose rotation is driven by a motor, and is provided movable upward and downward. The press roller, which is provided movable upward and downward immediately above the guide roller, comprises a metallic roller whose rotation is driven by a motor. When the optical display unit W is fed to the bonding position, the press roller is elevated to a position higher than the upper surface so that the space between the rollers is widened. Alternatively, the guide roller and the press roller may each be a rubber roller or a metallic roller. As described above, the system is configured so that the optical display unit W can be cleaned by any type of cleaning apparatus and fed by a feeding mechanism. The feeding mechanism is also controlled by the controller 1.

The first cutting and bonding apparatus 18 bonds the first optical film F11 to one surface of the optical display unit W and then cuts the first optical film F11, the surface protecting film F13, the first pressure-sensitive adhesive layer F14, and the pressure-sensitive adhesive layer F15 into a predetermined size. The first cutting and bonding apparatus 18 is typically equipped with a laser.

A description is given of the first removing apparatus 19 for removing part of the first sheet material F1, which is produced by the cutting between the adjacent optical display units W and not bonded to the optical display unit W. When part of the first sheet material F1 not bonded to the optical display unit W is fed to the cutting position, the part is cut and removed using a clamp, vacuum suction, or any other means. It may be configured in any other manner and, for example, may be configured so that part of the first sheet material F1 not bonded to the optical display unit W can be pressed against and attached to a remover film and that the part of the first sheet material F1 can be wound together with the remover film around a roller. In this case, the remover film can adhere to the first sheet material F1 by using the adhesive power of the first pressure-sensitive adhesive layer F14 of the first sheet material F1. Alternatively, however, a pressure-sensitive adhesive tape may be used as the remover film.

The optical display unit W to which the first optical film F11 is bonded as described above is fed to the downstream side, where the second optical film F21 (the second sheet material F2) is bonded thereto. Hereinafter, the same apparatus configuration will be described briefly.

The manufacturing system of the invention includes a feeder M4 for transporting and feeding the optical display unit W after the bonding of the first optical film F11. The feeder M4 preferably has a turning mechanism 20 for turning the optical display unit W to the direction of bonding in the second cutting and bonding apparatus 28 after the bonding in the first cutting and bonding apparatus 18. The presence of the turning mechanism 20 makes it unnecessary to set the feed direction of the first optical film F11 perpendicular to that of the second optical film F21, which makes it possible to save the space of the manufacturing system. In this case, the system is preferably configured so that the feed direction of the first optical film F11 is parallel to that of the second optical film F21.

For example, when the second optical film F21 is bonded in a 90° relationship (crossed Nicols relationship) with the first optical film F11, the optical display unit W is turned by 90° by the feeding direction-switching mechanism (turning mechanism 20) of the feeding mechanism, and then the second optical film F21 is bonded thereto. The method described below for bonding the second sheet material F2 includes performing each step, while keeping the second sheet material F2 turned upside down (with the second release film F22 facing upward), and bonding the second optical film F21 to the lower side of the optical display unit W.

The manufacturing system of the invention has the second optical film feeding apparatus M5 which draws and feeds the second sheet material F2 including the second optical film F21 from a roll of the second sheet material F2. This embodiment shows an example where the second optical film feeding apparatus M5 includes a second feeder 22, a second pre-inspection peeling apparatus, a second defect inspection apparatus 24, and a second release film bonding apparatus. In an embodiment of the invention, the presence of the second pre-inspection peeling apparatus, the second defect inspection apparatus 24, and the second release film bonding apparatus allows high accuracy inspection of the second optical film. Alternatively, however, these apparatuses may be omitted.

The second roll of the second belt-shaped sheet material F2 is mounted on a roll mount apparatus that is geared to a motor or the like to rotate freely or at a certain speed. The controller 1 sets the rotational speed and controls the drive.

The second feeder 22 is a feeding mechanism to feed the second sheet material F2 to the downstream side. The second feeder 22 is controlled by the controller 1.

The second pre-inspection peeling apparatus is configured to peel off the second release film F22 from the second sheet material F2 being fed and to wind the second release film F22 around a roll. The speed of winding it onto the roll is controlled by the controller 1. The peeling mechanism is configured so that the second release film F22 can be peeled off by reversing the feed direction of the second release film F22 and that the portion of the second sheet material F2 separated from the second release film F22 can be fed in the original feed direction.

The second defect inspection apparatus 24 inspects defects after the separation of the second release film F22. The second defect inspection apparatus 24 has a CCD camera, in which image data taken by the CCD camera is analyzed so that defects are detected and their position coordinates are calculated. The defect position coordinates are used in the process with the second cutting and bonding apparatus 28 as described below.

After the second defect inspection, the second release film bonding apparatus bonds the release film F22 to the second optical film F21 with the second pressure-sensitive adhesive layer F24 interposed therebetween. The release film F22 is unwound from the roll of the release film F22, and the release film F22 and the second optical film F21 are inserted between one or more pairs of rollers so that they are bonded to each other under a certain pressure from the pair of rollers. The rotational speed of the pair of rollers, the pressure, and the feeding are controlled by the controller 1.

The manufacturing system of the invention includes the second bonding apparatus 28 (M6) for bonding the second optical film F21, which is fed from the second optical film feeding apparatus M5, to the other surface of the optical display unit W, which is fed from the transporting and feeding apparatus M4. In an embodiment of the invention, the second cutting and bonding apparatus 28 is configured to bond the second optical film F21 to the other surface of the optical display unit W and then to cut the optical film into a length corresponding to the long or short side of the optical display unit, wherein when the optical film has a width corresponding to the short side, it is configured to cut the optical film into a length corresponding to the long side, and when the optical film has a width corresponding to the long side, it is configured to cut the optical film into a length corresponding to the short side. This embodiment shows an example where the second cutting and bonding apparatus 28 is configured to cut the optical film F21 with a width corresponding to the long side of the optical display unit W into a length corresponding to the short side. This embodiment also shows an example where the second cutting and bonding apparatus 28 includes a press roller and a guide roller and further includes a second peeling apparatus 27 and a second removing apparatus 29. The second removing apparatus 29 has a defective portion removing mechanism for removing defective portions from the optical film without bonding the portions to the optical display unit W when the second cutting and bonding apparatus 28 operates. Alternatively, however, such a removing mechanism may be omitted.

The second cutting and bonding apparatus 28 bonds part of the second sheet material F2 (the second optical film F21), from which the second release film F22 has been peeled off by the second peeling apparatus 27, to the optical display unit W with the second pressure-sensitive adhesive layer F24 interposed therebetween. In the bonding process, the second optical film F21 is bonded to the surface of the optical display unit W, while it is pressed against the surface by the press roller and the guide roller. The pressure from the press roller and the guide roller and the driving operation thereof are controlled by the controller 1.

The second peeling apparatus 27 has a peeling mechanism that is configured so that the second release film F22 can be peeled off by reversing the feeding direction of the second release film F22 and that part of the second sheet material F2 (the second optical film) peeled off from the second release film F22 can be fed to the surface of the optical display unit W. After peeled off, the release film F22 is wound around a roll. The winding around the roll is controlled by the controller 1.

The bonding mechanism includes a press roller and a guide roller opposed thereto, which are provided at the bonding position. The guide roller comprises a rubber roller whose rotation is driven by a motor, and is provided movable upward and downward. The press roller, which is provided movable upward and downward immediately under the guide roller, comprises a metallic roller whose rotation is driven by a motor. When the optical display unit W is fed to the bonding position, the press roller is shifted to a lower position so that the space between the rollers is widened. Alternatively, the guide roller and the press roller may each be a rubber roller or a metallic roller.

The second cutting and bonding apparatus 28 bonds the second optical film F21 to the other surface of the optical display unit W and then cuts the second optical film F21, the surface protecting film F23, the second pressure-sensitive adhesive layer F24, and the pressure-sensitive adhesive layer F25 into a predetermined size. The second cutting and bonding apparatus 28 is typically equipped with a laser.

A description is given of the second removing apparatus 29 for removing part of the second sheet material F2, which is produced by the cutting between the adjacent optical display units W and not bonded to the optical display unit W. When part of the second sheet material F2 not bonded to the optical display unit W is fed to the cutting position, the part is cut and removed using a clamp, vacuum suction, or any other means. It may be configured in any other manner and, for example, may be configured so that part of the second sheet material F2 not bonded to the optical display unit W can be pressed against and attached to a remover film and that the part of the second sheet material F2 can be wound together with the remover film around a roller. In this case, the remover film can adhere to the second sheet material F2 by using the adhesive power of the second pressure-sensitive adhesive layer F24 of the second sheet material F2. Alternatively, however, a pressure-sensitive adhesive tape may be used as the remover film.

The optical display device formed by bonding the first and second sheet materials to the optical display unit W is fed to an inspection apparatus. The inspection apparatus inspects both sides of the optical display device transported thereto. A light source and a half mirror are used to vertically illuminate the upper surface of the optical display device, and the reflected light is captured as image data by a CCD camera. Another light source is used to illuminate, at a predetermined angle, the surface of the optical display device, and the reflected light is also captured as image data by the CCD camera. The opposite surface of the optical display device may also be inspected using a light source and a CCD camera. These image data are subjected to image analysis to determine whether the product is non-defective.

For example, the timing of the operation of each apparatus is calculated by a detecting method using sensors placed at specific locations or by a method of detecting the rotating part of the feeder or the feeding mechanism with a rotary encoder or the like. The controller 1 may be implemented in cooperation with software programs and hardware resources such as CPU and memories. In this case, program software, procedures, various settings, etc. are previously stored in memories. Private circuits, firmware, or the like may also be used for the implementation.

Figure 5:
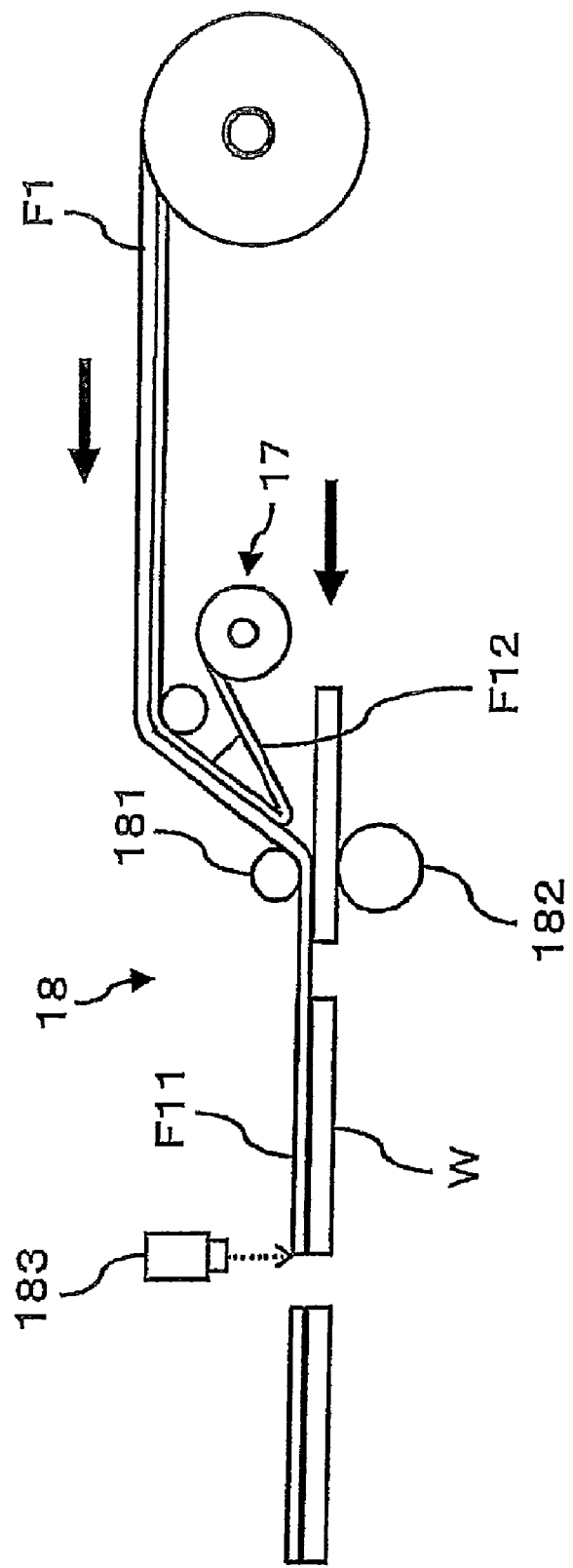
FIG. 5 is a schematic side view showing an example of the structure of a first cutting and bonding apparatus 18.

FIG. 5 is a schematic side view showing an example of the structure of the first cutting and bonding apparatus 18. In this example, the cutting position of cutting means (a laser 183) for cutting the first optical film F11 is located downstream at a distance of at least the length of a cut piece of the first optical film F11 from the bonding position of bonding means (a press roller 181 and a guide roller 182) for press-bonding the first optical film F11 and the optical display unit W therebetween. Therefore, the apparatus is configured so that when completely bonded to each optical display unit W, the first optical film F11 can be cut in the transverse direction at the front and rear ends of the optical display unit W.

Specifically, in this example, the apparatus is configured so that while the first optical film F11 is being bonded to each optical display unit W, the first optical film F11 being bonded to the optical display unit W is prevented from being cut at its front or rear end and that after the first optical film F11 is bonded to each optical display unit W, the first optical film F11 is cut at the front and rear ends to give a cut piece with a length corresponding to the long side of the optical display unit W. In such a method, a portion not bonded to the optical display unit W is produced from the first optical film F11 between the adjacent optical display units W, and such a portion can be removed using a clamp, vacuum suction, or any other means when the front end of the first optical film F11 is cut for each optical display unit W.

The cutting means for cutting the first optical film F11 is not limited to the laser 183 and may be formed using any other means such as an edged tool. The cutting means may be fixed in a predetermined position or allowed to slide in the transverse direction, when it cuts the first optical film F11. This example only shows the first cutting and bonding apparatus 18, but the second cutting and bonding apparatus 28 may also be configured in the same manner.

Figure 6:
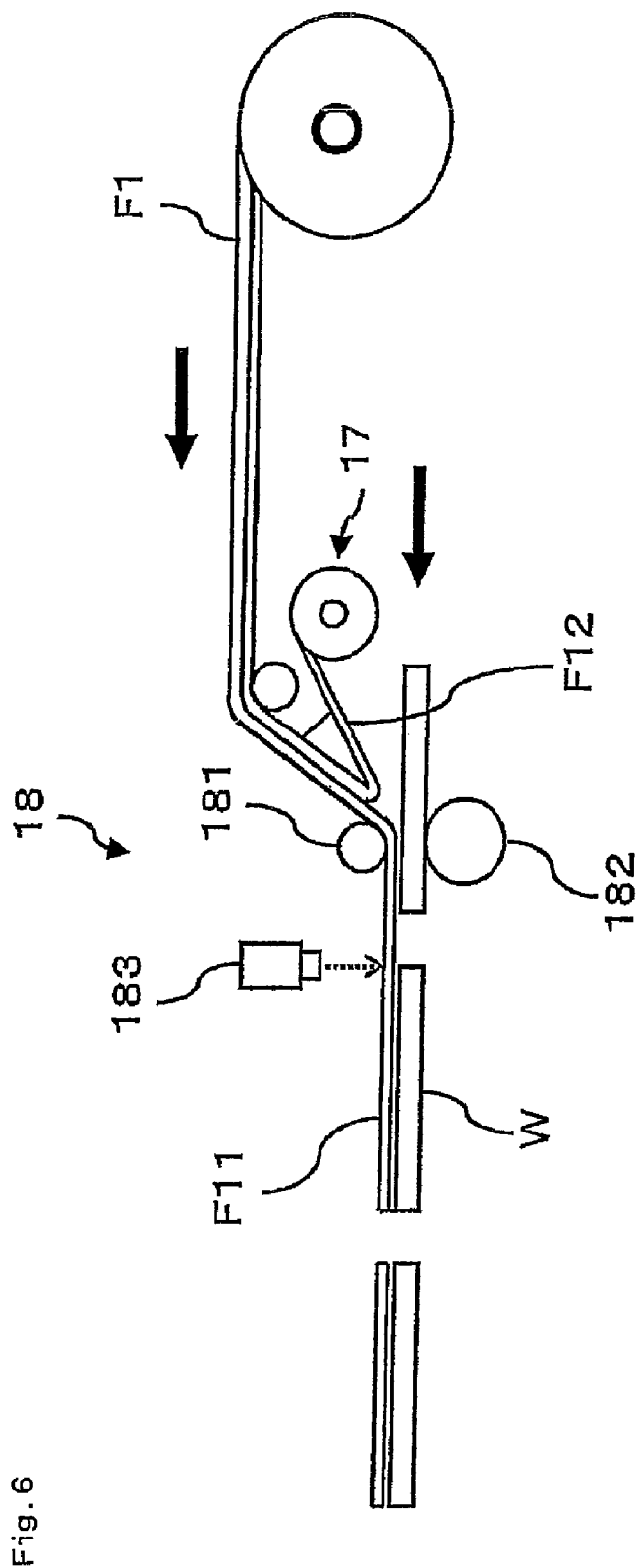
FIG. 6 is a schematic side view showing another example of the structure of the first cutting and bonding apparatus 18.

FIG. 6 is a schematic side view showing another example of the structure of the first cutting and bonding apparatus 18. In this example, the cutting position of cutting means (a laser 183) for cutting the first optical film F11 is located downstream at a distance of less than the length of a cut piece of the first optical film F11 from the bonding position of bonding means (a press roller 181 and a guide roller 182) for press-bonding the first optical film F11 and the optical display unit W therebetween. Therefore, the apparatus is configured so that before completely bonded to each optical display unit W, the first optical film F11 can be cut in the transverse direction at the front end of the optical display unit W and that after completely bonded to each optical display unit W, the first optical film F11 can be cut in the transverse direction at the rear end of the optical display unit W.

Specifically, in this example, the apparatus is configured so that while the first optical film F11 is being bonded to each optical display unit W, the first optical film F11 being bonded to the optical display unit W is cut at the front end and that after bonded to each optical display unit W, the first optical film F11 is cut at the rear end to give a cut piece with a length corresponding to the long side of the optical display unit W. In such a method, a portion not bonded to the optical display unit W is produced from the first optical film F11 between the adjacent optical display units W, and such a portion can be removed using a clamp, vacuum suction, or any other means when the front end of the first optical film F11 is cut for each optical display unit W.

The cutting means for cutting the first optical film F11 is not limited to the laser 183 and may be formed using any other means such as an edged tool. The cutting means may be fixed in a predetermined position or allowed to slide in the transverse direction, when it cuts the first optical film F11. This example only shows the first cutting and bonding apparatus 18, but the second cutting and bonding apparatus 28 may also be configured in the same manner.

Figure 7:
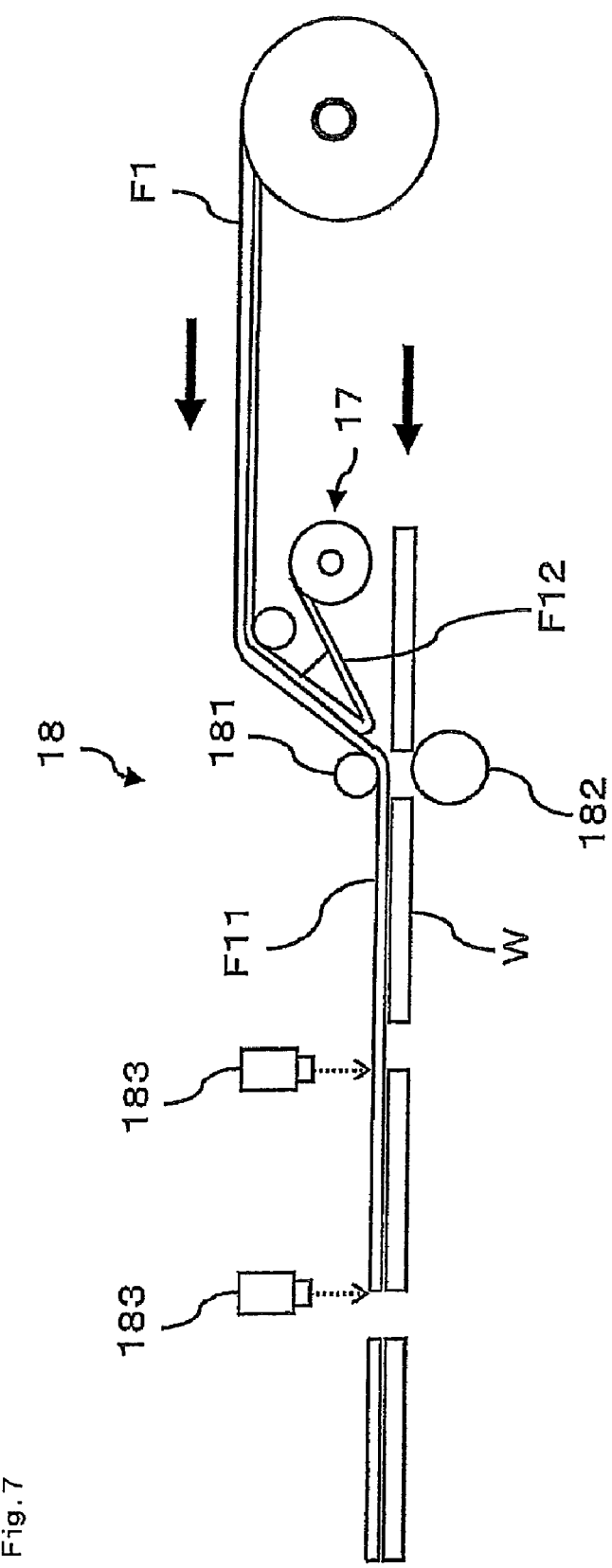
FIG. 7 is a schematic side view showing a further example of the structure of the first cutting and bonding apparatus 18.

FIG. 7 is a schematic side view showing a further example of the structure of the first cutting and bonding apparatus 18. In this example, cutting means (lasers 183) for cutting the first optical film F11 are provided in positions where the first optical film F11 will be cut at the front and rear ends of the optical display unit W, respectively, and they are placed from each other at a distance corresponding to the length of a cut piece of the first optical film F11. Specifically, when the first roll has a width corresponding to the short side of the optical display unit W, the cutting positions of the two lasers 183 are located at a distance corresponding to the long side of the optical display unit W from each other, and when the first roll has a width corresponding to the long side of the optical display unit W, the cutting positions of the two lasers 183 are located at a distance corresponding to the short side of the optical display unit W from each other.

The cutting position of the laser 183 provided in the position where cutting will be performed at the front end of the optical display unit W is located downstream at a distance of at least the length of a cut piece of the first optical film F11 from the bonding position of bonding means (a press roller 181 and a guide roller 182) for press-bonding the first optical film F11 and the optical display unit W therebetween. Therefore, the apparatus is configured so that when completely bonded to each optical display unit W, the first optical film F11 can be cut in the transverse direction at the front and rear ends of the optical display unit W.

The two lasers 183 cut the first optical film F11 at the front and rear ends of the optical display unit W at the same time or substantially at the same time. The first optical film F11 is fed intermittently at regular intervals, and the feeding is transiently stopped during the bonding. During the transient stop (namely, during the bonding), as shown in FIG. 7, the first optical film F11 is preferably not bonded to the following optical display unit W, and the bonding means is preferably located between the adjacent optical display units W. This can prevent the feeding of the first optical film F11 from being transiently stopped during the bonding of the first optical film F11 to the optical display unit W, so that uneven bonding or any other trouble can be prevented.

The cutting means for cutting the first optical film F11 are not limited to the lasers 183 and may be formed using any other means such as edged tools. The cutting means may be fixed in predetermined positions or allowed to slide in the transverse direction, when they cut the first optical film F11. This example only shows the first cutting and bonding apparatus 18, but the second cutting and bonding apparatus 28 may also be configured in the same manner.

Figure 8:
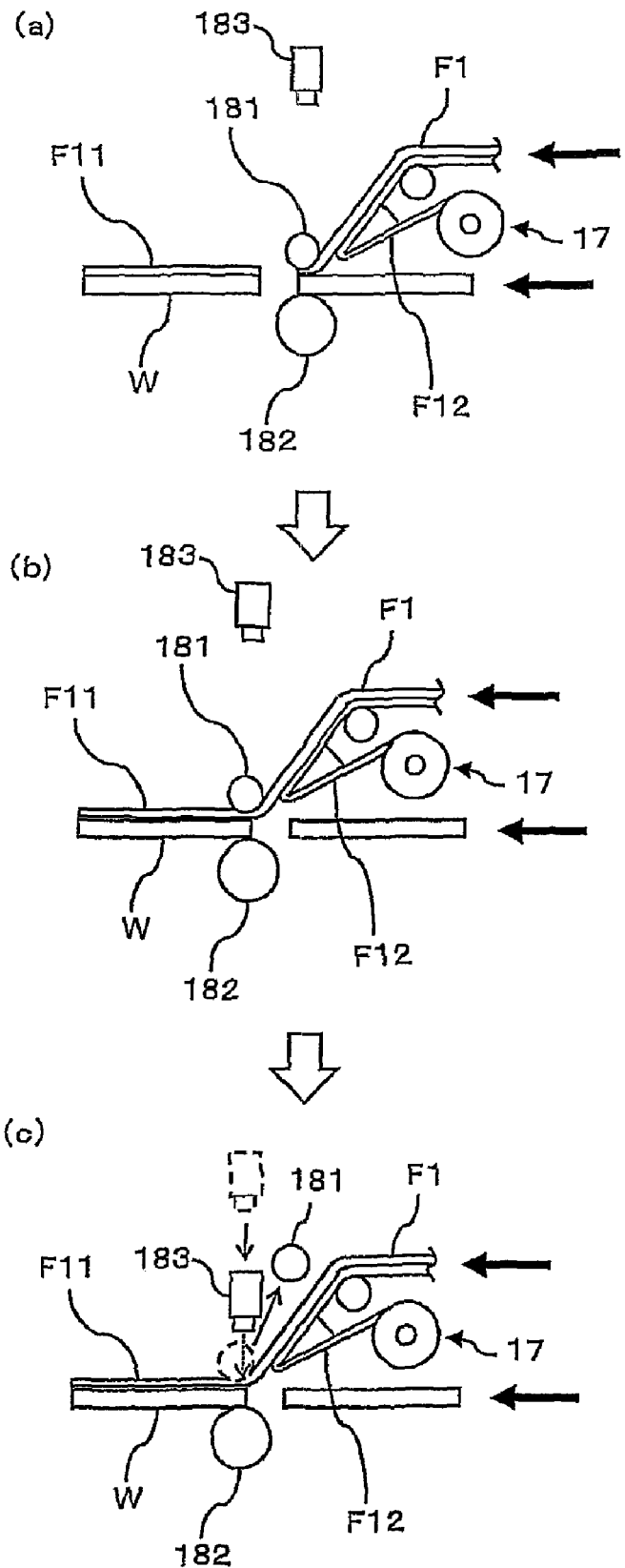
FIGS. 8 (*a-c*) are schematic side views showing further examples of the structures of the first cutting and bonding apparatus 18.

FIG. 8 is a schematic side view showing a further example of the structure of the first cutting and bonding apparatus 18. This example shows a structure in which the bonding position of bonding means (a press roller 181 and a guide roller 182) for press-bonding the first optical film F11 and the optical display unit W therebetween coincides with or substantially coincides with the cutting position of cutting means (a laser 183) for cutting the first optical film F11.

More specifically, the front ends of the optical display unit W and the first optical film F11 are each moved forward so that the bonding of them is started (FIG. 8(a)), and when the first optical film F11 is bonded to the optical display unit W from the front end to the rear end (FIG. 8(b)), the press roller 181 moves away upward, and the laser 183 approaches and cuts the first optical film F11 so that the rear end of the first optical film F11 is formed (FIG. 8(c)). The cutting results in the formation of the front end of the first optical film F11 to be bonded to the following optical display unit W. The procedure shown in FIGS. 8(a) to 8(c) is repeated to bond the first optical film F11 to the following optical display unit W.

Therefore, the apparatus is configured so that the first optical film F11 can be cut in the transverse direction at the rear end of the optical display unit W at or substantially at the time when the bonding to each optical display unit W is finished, and can be cut into a length corresponding to the long side of the optical display unit W after the first optical film F11 is completely bonded to each optical display unit W. In such a method, any portion not bonded to the optical display unit W is not produced from the first optical film F11 between the adjacent optical display units W.

The cutting means for cutting the first optical film F11 is not limited to the laser 183 and may be formed using any other means such as an edged tool. The cutting means may be fixed in a predetermined position or allowed to slide in the transverse direction, when it cuts the first optical film F11. This example only shows the first cutting and bonding apparatus 18, but the second cutting and bonding apparatus 28 may also be configured in the same manner.

The optical display device obtained by the manufacturing method of the invention includes the optical display units and the optical films bonded to both sides of the optical display unit. The optical display device can be used as an image display such as a liquid crystal display, an organic electroluminescence (EL) display, or a plasma display panel (PDP).

The liquid crystal display may be formed according to conventional techniques. Specifically, the liquid crystal display is usually formed by assembling a liquid crystal cell (corresponding to the optical display unit) and optical films, and optional components such as a lighting system and incorporating a driving circuit, according to any conventional techniques, except that the optical films are used according to the invention. The liquid crystal cell to be used may also be of any type such as TN (Twisted Nematic) type, STN (Super Twisted Nematic) type, or n type. In particular, a VA (Vertical Alignment) or IPS (In-Plane-Switching) mode liquid crystal cell is effectively used in an embodiment of the invention.

Any appropriate liquid crystal display may be formed such as a liquid crystal display including a liquid crystal cell and the optical film placed on one or both sides of the liquid crystal cell or a liquid crystal display using a backlight or a reflector in the lighting system. In that case, the optical film or films may be placed on one or both sides of the liquid crystal cell. The optical films placed on both sides may be the same or different. In the process of forming the liquid crystal display, one or more layers of an additional appropriate component or components such as a diffusion plate, an antiglare layer, an anti-reflection film, a protective plate, a prism array, a lens array sheet, a light diffusion plate, and a backlight may also be placed at an appropriate location or locations.

The optical film or films may be placed on one or both sides of a liquid crystal cell to form a liquid crystal display having an appropriate structure according to conventional techniques, such as a transmissive, reflective or transflective liquid crystal display. Therefore, the liquid crystal cell used to form a liquid crystal display may be of any type. Any appropriate type of liquid crystal cell such as an active matrix driving type typified by a thin film transistor type may be used.

The polarizing plates or the optical components provided on both sides of a liquid crystal cell may be the same or different. In the process of forming a liquid crystal display, one or more layers of an additional appropriate component or components such as a prism array sheet, a lens array sheet, a light diffusion plate, and a backlight may be placed at an appropriate location or locations.

Bonding Methods Performed Using Turn According to Other Embodiments

The embodiment described above shows a case where one of the first and second optical films F11 and F21 is bonded to the optical display unit W from the upper side, and the other is bonded to the optical display unit W from the lower side. Alternatively, the system may be configured so that both the first and second optical films F11 and F21 can be bonded to the optical display unit W from one of the upper and lower sides. In this case, the process may include bonding the first optical film F11 to one surface of the optical display unit W from the upper or lower side, then turning the optical display unit W so that it can be turned over and rotated, and bonding the first optical film F11 to the other surface. For example, the turning may be performed in such a manner that the optical film is turned over and rotated by 90°, which makes it possible to bond the first and second optical films F11 and F21 in a crossed Nicols relationship with each other.

FIG. 10 is a schematic diagram showing examples of the method of turning the optical display unit W in such a manner that it is turned over and rotated by 90°. Parts (a) and (b) of FIG. 10 show methods in which the optical display unit W is turned over so as to have a 90° relationship. Part (a) shows an example where the optical display unit W is turned over around a horizontal rotation axis A1 passing through a corner of the optical display unit W, and part (b) shows an example where the optical display unit W is turned over around a horizontal rotation axis A2 passing through the center of the optical display unit W. Part (c) of FIG. 10 shows a method in which turning over and rotation are performed in two stages so that a 90° relationship can be achieved, wherein the turning over and the rotation may be performed in any order. Part (d) of FIG. 10 shows a method in which rotation is performed to achieve a 90° relationship, while turning over is performed, using a turning mechanism 20 including a mechanism for rotating the optical display unit W in a horizontal plane and a mechanism for turning over the optical display unit W around a horizontal rotation axis A3.

The terms "rotated by 90°" and "a 90° relationship" mean a state or relationship where the long side of the optical display unit W after the turning is parallel to the short side before the turning and the short side of the optical display unit W after the turning is parallel to the long side before the turning. It will be understood that the method of turning the optical display unit W is not limited to the modes shown in FIG. 10 and the optical display unit W may be turned over and rotated by 90° in any other mode.

Manufacturing Systems According to Other Embodiments

Figure 9:
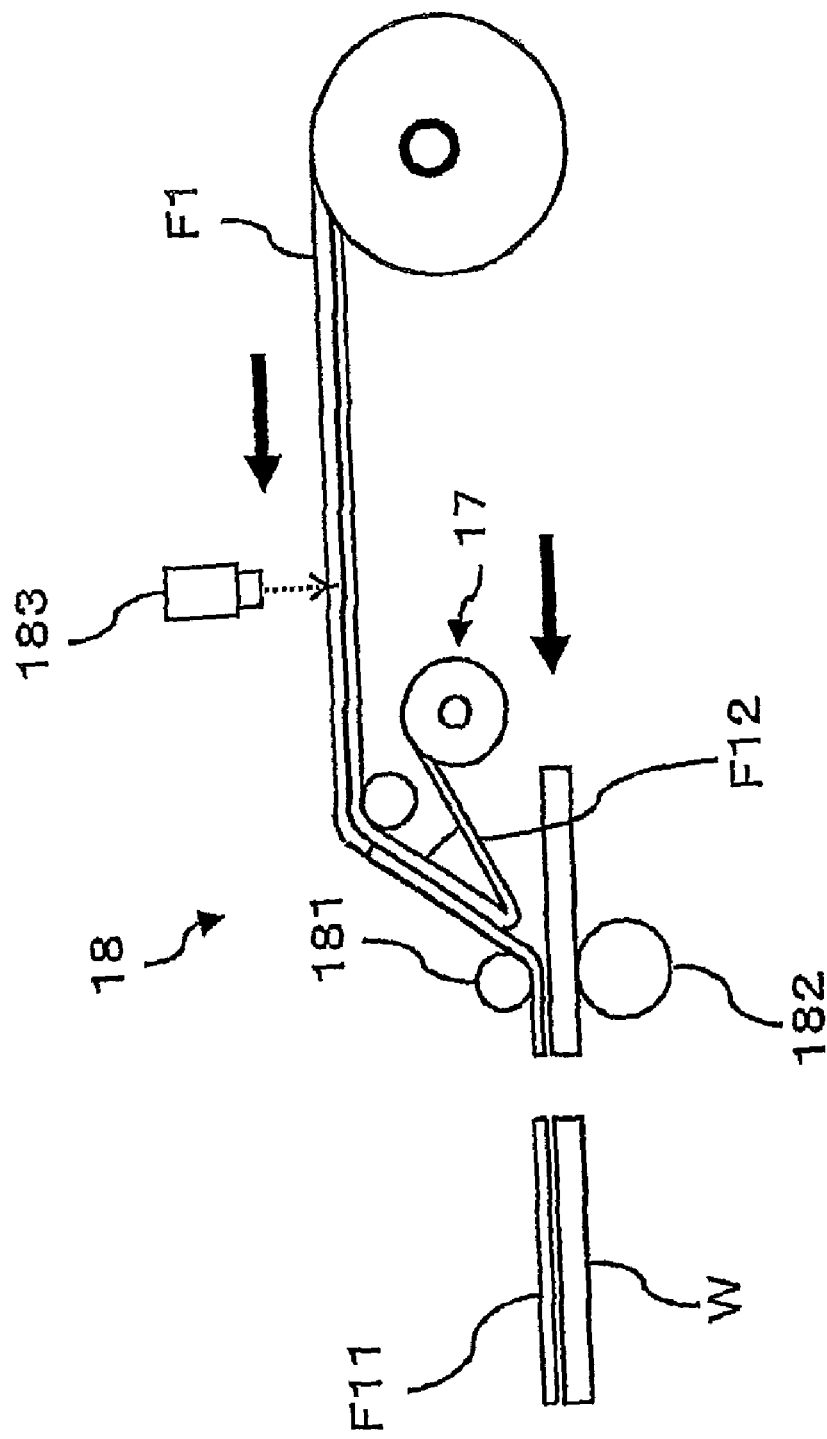
FIG. 9 is a schematic side view showing an example of the structure of a first cutting and bonding apparatus in another mode of the manufacturing system of the invention.

FIG. 9 is a schematic side view showing an example of the structure of the first cutting and bonding apparatus 18 in a manufacturing system according to another embodiment of the invention. FIG. 9 only shows an example of the structure of the first cutting and bonding apparatus 18, but the same structure may be used to form the second cutting and bonding apparatus 28.

While the above embodiment has shown a structure in which the first optical film F11 is cut after bonded to the surface of the optical display unit W, this embodiment shows another structure configured so that the optical film F11 is cut and then bonded to the optical display unit W. In this example, therefore, the cutting position of cutting means 183 for cutting the first optical film F11 is located upstream of the bonding position of bonding means (a press roller 181 and a guide roller 182) for press-bonding the first optical film F11 and the optical display unit W therebetween.

The cutting means 183 cuts (half-cuts) the first sheet material F1 while leaving the release film F12 uncut. In this process, the release film F12 functions as a carrier film for carrying the cut piece of the first optical film F11. After the cutting means 183 half-cuts the first sheet material F1, a first peeling apparatus 17 peels off the release film F12, and the bonding means (the press roller 181 and the guide roller 182) bonds the first optical film F11 to the surface of the optical display unit W with the first pressure-sensitive adhesive layer F14 interposed therebetween.

In a further embodiment, the respective apparatuses of the manufacturing system of the invention may be arranged in any order. For example, the optical display unit W feeding apparatus M1, the first optical film F11 feeding apparatus M2, and the first cutting and bonding apparatus M3 may be linearly arranged, and the second optical film F21 feeding apparatus M5 and the second cutting and bonding apparatus M6 may be arranged parallel to the linearly arranged apparatuses. The feeder M4 may be placed between the first and second cutting and bonding apparatuses M3 and M6.

In an embodiment of the invention, when no mechanism is provided for turning the optical display unit W, the first optical film F11 feeding apparatus M2 and the first cutting and bonding apparatus M3 are preferably arranged perpendicular to the second optical film F21 feeding apparatus M5 and the second cutting and bonding apparatus M6.

DESCRIPTION OF REFERENCE CHARACTERS

In the drawings, reference character F1 represents a first sheet material, F2 a second sheet material, F11 a first optical film, F11a a first polarizer, F11b a first film, F11c a second film, F12 a first release film, F13 a surface protecting film, F14 a first pressure-sensitive adhesive layer, F21 a second optical film, F21a a second polarizer, F21b a third film, F21c a fourth film, F22 a second release film, F23 a surface protecting film, F24 a second pressure-sensitive adhesive layer, M1 an optical display unit feeding apparatus, M2 a first optical film feeding apparatus, M3 a first cutting and bonding apparatus, M4 a feeder, M5 a second optical film feeding apparatus, M6 a second cutting and bonding apparatus, 1 a controller, 12 a first feeder, 14 a first defect inspection apparatus, 17 a first peeling apparatus, 18 a first cutting and bonding apparatus, 19 a first removing apparatus, 20 a turning mechanism, 22 a second feeder, 24 a second defect inspection apparatus, 27 a second peeling apparatus, 28 a second cutting and bonding apparatus, 29 a second removing apparatus, and W an optical display unit.

The invention claimed is:

1. A system for manufacturing an optical display device comprising a rectangular optical display unit and an optical film bonded thereto including a polarizing plate, comprising:
   an optical display unit feeding apparatus for feeding an optical display unit;
   a first roll of a first belt-shaped sheet material, the first belt-shaped sheet material comprising a first optical film including a first polarizing plate having an absorption axis parallel to a longitudinal direction of the first polarizing plate;
   a first optical film feeding apparatus for drawing and feeding the first belt-shaped sheet material from the first roll of the first belt-shaped sheet material;
   a first cutting and bonding apparatus that comprises first bonding means for bonding the first optical film to one surface of the optical display unit, wherein the optical display unit is fed from the optical display unit feeding apparatus and the first optical film is fed from the first optical film feeding apparatus, and first cutting means for cutting the first optical film fed from the first optical film feeding apparatus;

a feeder for transporting and feeding the optical display unit after the bonding of the first optical film;

a second roll of a second belt-shaped sheet material, the second belt-shaped sheet material comprising a second optical film including a second polarizing plate having an absorption axis parallel to a longitudinal direction of the second polarizing plate, wherein the absorption axis of the second polarizing plate is in the same direction as the absorption axis of the first polarizing plate;

a second optical film feeding apparatus for drawing and feeding the second belt-shaped sheet material from the second roll of the second belt-shaped sheet material; and a second cutting and bonding apparatus that comprises second bonding means for bonding the second optical film to another surface of the optical display unit, wherein the optical display unit is fed from the feeder and the second optical film is fed from the second optical film feeding apparatus, and second cutting means for cutting the second optical film fed from the second optical film feeding apparatus, wherein one of the first and second cutting and bonding apparatuses is configured to cut an optical film with a width corresponding to a short side of the optical display unit into a length corresponding to a long side of the optical display unit, and the other of the first and second cutting and bonding apparatuses is configured to cut an optical film with a width corresponding to the long side of the optical display unit into a length corresponding to the short side of the optical display unit, the feeder comprises a turning mechanism for turning the optical display unit to a bonding direction for the second cutting and bonding apparatus after the bonding in the first cutting and bonding apparatus, and wherein a feeding direction of the first optical film feeding apparatus is parallel to a feeding direction of the second optical film feeding apparatus.

2. The system according to claim 1, wherein the first cutting and bonding apparatus is configured to bond the first optical film to one surface of the optical display unit by the first bonding means and then to cut the first optical film by the first cutting means, and the second cutting and bonding apparatus is configured to bond the second optical film to another surface of the optical display unit by the second bonding means and then to cut the second optical film by the second cutting means.

3. A method for manufacturing an optical display device comprising a rectangular optical display unit and an optical film bonded thereto including a polarizing plate, comprising:

an optical display unit feeding step comprising feeding an optical display unit;

a first optical film feeding step comprising drawing and feeding a first belt-shaped sheet material comprising a first optical film from a first roll of the first belt-shaped sheet material, the first belt-shaped sheet material being obtained by lengthwise slitting a first long material comprising a first polarizing plate having an absorption axis parallel to its longitudinal direction;

a first cutting and bonding step that comprises a first bonding step comprising bonding the first optical film to one surface of the optical display unit, wherein the optical display unit is fed by the optical display unit feeding step and the first optical film is fed by the first optical film feeding step, and a first cutting step comprising cutting the first optical film fed by the first optical film feeding step;

a feeding step comprising transporting and feeding the optical display unit after the bonding of the first optical film;

a second optical film feeding step comprising drawing and feeding a second belt-shaped sheet material comprising a second optical film from a second roll of the second belt-shaped sheet material, the second belt-shaped sheet material being obtained by lengthwise slitting a second long material comprising a second polarizing plate having an absorption axis parallel to its longitudinal direction, wherein the second optical film comprises a polarizing plate having an absorption axis in the same direction as that of a polarizing plate in the first optical film; and a second cutting and bonding step that comprises a second bonding step comprising bonding the second optical film to another surface of the optical display unit, wherein the optical display unit is fed by the feeding step and the second optical film is fed by the second optical film feeding step, and a second cutting step comprising cutting the second optical film fed by the second optical film feeding step, wherein one of the first and second cutting and bonding steps is performed to cut an optical film with a width corresponding to a short side of the optical display unit into a length corresponding to a long side of the optical display unit, and the other of the first and second cutting and bonding steps is performed to cut an optical film with a width corresponding to the long side of the optical display unit into a length corresponding to the short side of the optical display unit, the feeding step comprises a turning step comprising turning the optical display unit to a bonding direction for the second cutting and bonding step after the bonding in the first cutting and bonding step, and wherein a feeding direction of the first optical film is parallel to a feeding direction of the second optical film.

4. The method according to claim 3, wherein the first cutting and bonding step is performed to bond the first optical film to one surface of the optical display unit by the first bonding step and then to cut the first optical film by the first cutting step, and the second cutting and bonding step is performed to bond the second optical film to another surface of the optical display unit by the second bonding step and then to cut the second optical film by the second cutting step.

* * * * *